US012755479B2

(12) United States Patent
Xiong et al.

(10) Patent No.: US 12,755,479 B2
(45) Date of Patent: Oct. 6, 2026

(54) VIDEO COMMUNICATION AND STREAMING USING DIFFUSION GUIDED BY CONTROL DATA DERIVED FROM AUDIO

(71) Applicant: IKIN, Inc., Dripping Springs, TX (US)

(72) Inventors: See Xiong, Dripping Springs, TX (US); James Charles Stiefelmaier, Austin, TX (US); Bryan Lloyd Westcott, Austin, TX (US)

(73) Assignee: IKIN, Inc., Dripping Springs, TX (US)

( * ) Notice: Subject to any disclaimer, the term of this patent is extended or adjusted under 35 U.S.C. 154(b) by 116 days.

(21) Appl. No.: 18/952,579

(22) Filed: Nov. 19, 2024

(65) Prior Publication Data

US 2025/0166290 A1 May 22, 2025

Related U.S. Application Data

(60) Provisional application No. 63/601,096, filed on Nov. 20, 2023.

(51) Int. Cl.

| | |
|---|---|
| ***G06T 15/20*** | (2011.01) |
| ***G06F 40/58*** | (2020.01) |
| ***G06T 5/70*** | (2024.01) |

(52) U.S. Cl.

CPC .............. *G06T 15/20* (2013.01); *G06F 40/58* (2020.01); *G06T 5/70* (2024.01); *G06T 2200/04* (2013.01);

(Continued)

(58) Field of Classification Search

CPC ....... G06T 15/20; G06T 5/70; G06T 2200/04; G06T 2207/20081; G06T 2207/20084;

(Continued)

(56) References Cited

U.S. PATENT DOCUMENTS

| | | | | |
|---|---|---|---|---|
| 12,530,564 B1 * | 1/2026 | Bouvrie | ................. | G06N 3/045 |
| 12,554,796 B2 * | 2/2026 | Xu | .......................... | G06F 18/22 |

(Continued)

OTHER PUBLICATIONS

Daniel Watson, William Chan, Ricardo Martin-Brualla, Jonathan Ho, Andrea Tagliasacchi, & Mohammad Norouzi. (2022). Novel View Synthesis with Diffusion Models. (Year: 2022).*

*Primary Examiner* — Kee M Tung
*Assistant Examiner* — Nauman U Ahmad
(74) *Attorney, Agent, or Firm* — Cooley LLP

(57) ABSTRACT

A computer-implemented method for image generation includes receiving conditioning data derived from imagery within input data frames. Auxiliary audio data derived from words or sounds vocalized by a subject within the input data frames is received. The audio data is included within audio content associated the input data frames. The conditioning data and the auxiliary audio data is provided to a composite artificial neural network where the composite artificial neural network is configured to perform a controlled diffusion process. The composite artificial neural network includes a neural network implementing a diffusion model in combination with a control neural network. The composite artificial neural network generates reconstructed versions of the input data frames based upon the conditioning data and the auxiliary audio data.

20 Claims, 12 Drawing Sheets

(52) U.S. Cl.
CPC ............... *G06T 2207/20081* (2013.01); *G06T 2207/20084* (2013.01); *G06T 2207/30201* (2013.01)

(58) Field of Classification Search
CPC .......... G06T 2207/30201; G06F 40/58; G06N 3/045; G06N 3/08; G06N 3/084; G06N 3/096
See application file for complete search history.

(56) References Cited

U.S. PATENT DOCUMENTS

| | | | | |
|---|---|---|---|---|
| 2024/0193422 | A1* | 6/2024 | Sher | G06N 3/084 |
| 2025/0225700 | A1* | 7/2025 | Li | G06T 11/60 |
| 2026/0004476 | A1* | 1/2026 | Chen | G06T 11/00 |

* cited by examiner

VIDEO COMMUNICATION AND STREAMING USING DIFFUSION GUIDED BY CONTROL DATA DERIVED FROM AUDIO

CROSS-REFERENCE TO RELATED APPLICATION

This application claims priority to U.S. Provisional Patent Application 63/601,096, filed Nov. 20, 2023, the contents of which are incorporated herein by reference.

FIELD

The present disclosure generally relates to techniques for video communication and content streaming and, more particularly, to methods for creating compressed video streams.

BACKGROUND

Dynamic scenes, such as live sports events or concerts, are often captured using multi-camera setups to provide viewers with a range of different perspectives. Traditionally, this has been achieved using fixed camera positions, which limits the viewer's experience to a predefined set of views. Generating photorealistic views of dynamic scenes from additional views (beyond the fixed camera views) is a highly challenging topic that is relevant to applications such as, for example, virtual and augmented reality. Traditional mesh-based representations are often incapable of realistically representing dynamically changing environments containing objects of varying opacity, differing specular surfaces, and otherwise evolving scene environments. However, recent advances in computational imaging and computer vision have led to the development of new techniques for generating virtual views of dynamic scenes.

One such technique is the use of neural radiance fields (NeRFs), which allows for the generation of high-quality photorealistic images from novel viewpoints. NeRFs are based on a neural network that takes as input a 3D point in space and a camera viewing direction and outputs the radiance, or brightness, of that point. This allows for the generation of images from any viewpoint by computing the radiance at each pixel in the image. NeRF enables highly accurate reconstructions of complex scenes. Despite being of relatively compact size, the resulting NeRF models of scene allow for fine-grained resolution to be achieved during the scene rendering process.

Unfortunately, NeRFs are computationally expensive due to the large amount of data required to store radiance information for a high-resolution 3D space. For instance, storing radiance information at 1-millimeter resolution for a 10-meter room would require a massive amount of data given that there are 10 billion cubic millimeters in a 10-meter room. Additionally, and as noted above, NeRF systems must use a volume renderer to generate views, which involves tracing rays through the cubes for each pixel. Again, considering the example of the 10-meter room, this would require approximately 82 billion calls to the neural net to achieve 4k image resolution.

In view of the substantial computational and memory resources required to implement NeRF, NeRF has not been used to reconstruct dynamic scenes. This is at least partly because the NeRF model would need to be trained on each frame representing the scene, which would require prodigious amounts of memory and computing resources even in the case of dynamic scenes of short duration. Additionally, changes in external illumination (lighting) could significantly alter the NeRF model, even if the structure of the scene does not change, requiring a large amount of computation and additional storage. As a consequence, NeRF and other novel view scene encoding algorithms have been limited to modeling static objects and environments.

SUMMARY

In one aspect the disclosure relates to a computer-implemented method for generating image sequences that includes receiving conditioning data derived from imagery within input data frames. The method further includes receiving auxiliary audio data derived from words or sounds vocalized by a subject within the input data frames where the audio data is included within audio content associated the input data frames. The conditioning data and the auxiliary audio data are provided to a composite artificial neural network configured to perform a controlled diffusion process. The composite artificial neural network includes a neural network implementing a diffusion model in combination with a control neural network. The method further includes generating, by the composite artificial neural network, reconstructed versions of the input data frames based upon the conditioning data and the auxiliary audio data.

The disclosure further relates to a computer-implemented method that includes generating a set of fine-tuning weights for a pre-trained diffusion model. The fine-tuning weights are generated by training an artificial neural network using a first set of frames of training image data involving a subject and conditioning training data derived from the first set of frames of training image data. The artificial neural network includes one or more layers with fixed weights implementing the pre-trained diffusion model and at least one trainable layer including the fine-tuning weights where values of the fine-tuning weights are adjusted during the training. The method further includes training a composite neural network including the artificial neural network and a control neural network. The training of the composite neural network includes providing, to the composite neural network, a second set of frames of training image data involving the subject and auxiliary training data derived from audio data associated with the second set of frames of training image data. The values of the fine-tuning weights and values of weights of the control neural network may then be stored.

The disclosure also pertains to a computer-implemented method for generating image sequences that includes receiving, at a computing device, values of weights of a first artificial neural network implementing a diffusion model and values of weights of a first control neural network. The weights of the first artificial network are generated by training the first artificial neural network using a first set of frames of training image data involving a subject and conditioning training data derived from the first set of frames of training image data. The weights of the first control network are generated by training a first composite neural network including the first artificial neural network and the first control neural network. The training the first composite neural network includes providing, to the first composite neural network, a second set of frames of training image data involving the subject and auxiliary training data derived from audio data associated with the second set of frames of training image data. A second artificial neural network is configured based upon the values of the weights of the first artificial neural network. A second control neural network is modified based upon the values of the weights of the first control neural network where the second control neural network and the second artificial neural network form a second composite neural network. The method further includes receiving, at the computing device, conditioning data derived from input frames of image data containing the subject and auxiliary data generated from audio data associated with the input frames of image data. The second composite neural network generates images corresponding to the input frames of image data using the conditioning data and the auxiliary data.

In another aspect the disclosure relates to a computer-implemented method that includes training a first artificial neural network implementing a diffusion model. The training includes providing the first artificial neural network with a first set of frames of training image data involving a subject and conditioning training data derived from the first set of frames of training image data. The method further includes training a first composite neural network including the first artificial neural network and a first control neural network. The training of the first composite neural network includes providing, to the first composite neural network, a second set of frames of training image data involving the subject and auxiliary training data derived from audio data associated with the second set of frames of training image data. Values of weights of the first artificial neural network and values of weights of the first control neural network are then sent to a computing device. The computing device is disposed to configure a second artificial neural network based upon the values of the weights of the first artificial neural network and to modify a second control neural network based upon the values of the weights of the first control neural network. The second control neural network and the second artificial neural network form a second composite neural network. The method further includes deriving conditioning data from input frames of image data containing the subject and generating auxiliary data from audio data associated with the input frames of image data. The conditioning data and the auxiliary data are then sent to the computing device, at which the second composite neural network is configured to generate images corresponding to the input frames of image data using the conditioning data and the auxiliary data.

The disclosure is further directed to a computer-implemented method for generating image sequences. The method includes receiving, at a computing device, values of fine-turning weights for a first artificial neural network implementing a pre-trained diffusion model and values of weights of a first control neural network. The weights of the first artificial network are generated by training the first artificial neural network using a first set of frames of training image data involving a subject and conditioning training data derived from the first set of frames of training image data. The weights of the first control network are generated by training a first composite neural network including the first artificial neural network and the first control neural network. Training the first composite neural network includes providing, to the first composite neural network, a second set of frames of training image data involving the subject and auxiliary training data derived from audio data associated with the second set of frames of training image data. The first artificial neural network includes one or more layers with fixed weights implementing the pre-trained diffusion model and at least one trainable layer including the fine-tuning weights where the values of the fine-tuning weights are adjusted during the training of the first artificial neural network. The method further includes configuring a second artificial neural network by inserting the values of the fine-tuning weights into an adaptable layer of the second artificial neural network where the second artificial neural network includes fixed-weight layers implementing the pre-trained diffusion model. A second control neural network is modified based upon the values of the weights of the first control neural network. The second control neural network and the second artificial neural network form a second composite neural network. The method further includes receiving, at the computing device, conditioning data derived from input frames of image data containing the subject and auxiliary data generated from audio data associated with the input frames of image data. The second composite neural network then generates images corresponding to the input frames of image data using the conditioning data and the auxiliary data.

The disclosure further pertains to a computer-implemented method which includes generating a set of fine-tuning weights for a pre-trained diffusion model. The generating operation includes training a first artificial neural network using a first set of frames of training image data involving a subject and conditioning training data derived from the first set of frames of training image data. The first artificial neural network may have one or more layers with fixed weights implementing the pre-trained diffusion model and at least one trainable layer including the fine-tuning weights where values of the fine-tuning weights are adjusted during the training. The method further includes training a first composite neural network including the first artificial neural network and a first control neural network. The training includes providing, to the first composite neural network, a second set of frames of training image data involving the subject and auxiliary training data derived from audio data associated with the second set of frames of training image data. The values of the fine-tuning weights and values of weights of the first control neural network are sent to a computing device. During operation the computing device is disposed to (i) insert the values of the fine-tuning weights into an adaptable layer of a second artificial neural network having fixed-weight layers implementing the pre-trained diffusion mode and (ii) modify a second control neural network based upon the values of the weights of the first control neural network. The second control neural network and the second artificial neural network form a second composite neural network. Conditioning data is derived from input frames of image data containing the subject and auxiliary data is generated from audio data associated with the input frames of image data. The conditioning data and the auxiliary data is sent to the computing device. The second composite neural network is configured at the computing device to generate images corresponding to the input frames of image data using the conditioning data and the auxiliary data.

BRIEF DESCRIPTION OF THE DRAWINGS

The invention is more fully appreciated in connection with the following detailed description taken in conjunction with the accompanying drawings, in which.

Like reference numerals refer to corresponding parts throughout the several views of the drawings.

DETAILED DESCRIPTION

Introduction

Figure 1:
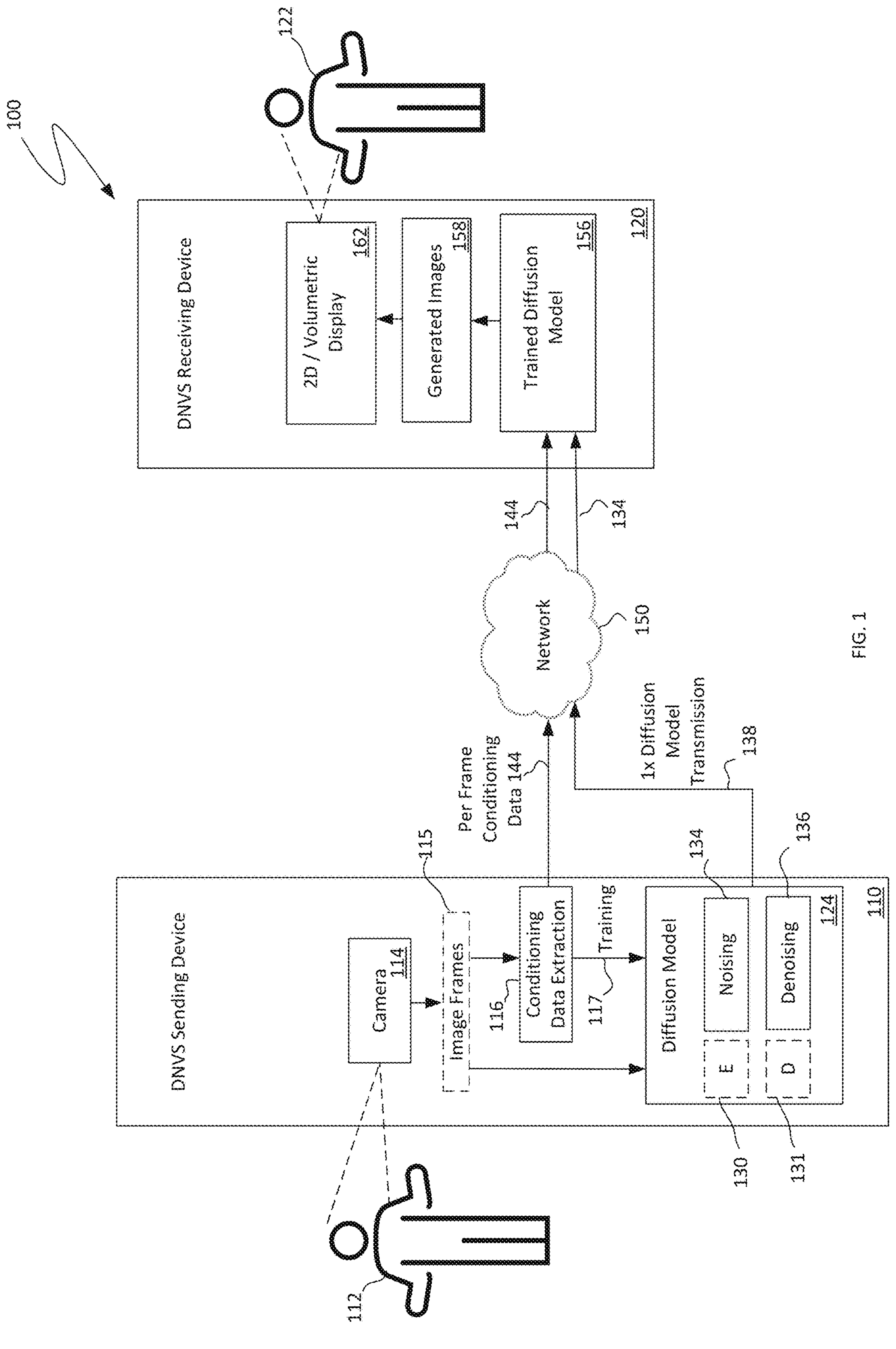
FIG. 1 illustrates a diffusion-based novel view synthesis (DNVS) communication system in accordance with an embodiment.

Conditional Diffusion for Video Communication and Streaming

In one aspect the disclosure relates to a conditional diffusion process capable of being applied in video communication and streaming of pre-existing media content. As an initial matter consider that the process of conditional diffusion may be characterized by Bayes' theorem:

$$p(x \mid y) = p(y \mid x) * p(x)/p(y)$$

One of the many challenges of practical use of Bayes' theorem is that it is intractable to compute p(y). One key to utilizing diffusion is to use score matching (log of the likelihood) to make p(y) go away in the loss function (the criteria used by the machine-learning (ML) model training algorithm to determine what a "good" model is). This yields:

$$\begin{aligned} \text{E\_p}(x)\log[p(x \mid y)] &= \text{E\_p}(x)\log\left[p(y \mid x)p(x)/p(y)\right] = \\ &\text{E\_p}(x)[\log(p(y \mid x)) + \log(p(x) - \log(p(y))] = \\ &\text{E\_p}(x)[\log(p(y \mid x)) + \log(p(x)] \end{aligned}$$

Since p(x) remains unknown an unconditional diffusion model is used, along with a conditional diffusion model for p(y|x). One principal benefit of this approach is that it is learned how to invert a process (p(y|x)) but balance that progress with the prior (p(x)), which enables learning from experience and provides improved realism (or improved adherence to a desired style). The use of the high-quality diffusion models will allow low-bandwidth, sparse representations (y) to be improved.

In order to use this approach in video communication or a 3D-aware/holographic chat session, the relevant variables in this context may be characterized as follows:

- x is image(s) of a specific face in a lot of different expressions and a lot of different poses gives you the unconditional diffusion model q(x) that approximates p(x).
- y is the 3D face mesh coordinates (e.g., MediaPipe, optionally to include body pose coordinates and even eye gaze coordinates), in the most basic form but may also include additional dimensions (e.g., RGB values at those coordinates).
- We simply use MediaPipe to produce y from x and thus we can train the conditional diffusion model q(y|x) that estimates p(y|x) using diffusion.
- Then we have everything we need to optimize the estimate of p(x|y).

How would this approach work in a holographic chat or 3D aware communication context? In the case of holographic chat, one key insight is that the facial expressions and head/body pose relative to the captured images can vary. This means that a receiver with access to q(y|x) can query a new pose by moving those rigid 3D coordinates (y) around in 3D space to simulate parallax. This has two primary benefits:

1. They are sparse and thus require less bandwidth
2. They can be rotated purely at the receiver thus providing parallax for holographic video.

A holographic chat system would begin by training a diffusion model (either from scratch or as a customization as is done with LoRA) on a corpus of selected images (x), and face mesh coordinates (y) derived from the images, for the end user desiring to transmit their likeness. Those images may be in a particular style: e.g., in business attire, with combed hair, make-up, etc. After that model q(y|x) is transmitted, you can then then transmit per-frame face mesh coordinates, and then we simply use our head-tracking to query the view we need to provide parallax. The key is an unconditional noise process model q(y|x) is sent from a transmitter to a receiver once. After the unconditional noise process has been sent, the transmitter just sends per-frame face mesh coordinates (y).

Set forth below are various possible some extensions made possible by this approach:

- Additional dimensions of information could be provided with each face mesh point, for example RGB values, which gives some additional information on the extrinsic illumination.
- Body pose coordinates could be added and altered independently of the face/eyes, allowing the gaze direction of the user to be synthetically altered. When combined with knowledge of the viewer's location and monitor information, this could provide virtual eye contact that is not possible with current webchat as a camera would need to be positioned in the middle of the monitor.
- Any other additional low-bandwidth/sparse information (discussed in compression section) could be added, including background information. The relative poses of the user and the background could be assisted with embedded or invisible (to the human eye) fiducial markers such as ArUco markers.

If we track the gaze of the receiving user, we could selectively render/upsample the output based on the location being at any given moment, which saves rendering computation.

For more general and non-3D-aware applications (e.g., for monocular video) the transmitter could use a number of sparse representations for transmitted data (y) including:

- canny edge locations, optionally augmented with RGB and/or depth (from a library such as DPT).
- features used for computer vision (e.g., DINO, SIFT).
- a low-bandwidth (low-pass-filtered) and downsampled version of the input.
- AI feature correspondences: transmit the feature correspondence locations and ensure the conditional diffusion reconstructs those points to correspond correctly in adjacent video frames.
  - Note: this is different from the TokenFlow video diffusion approach as it enforces the correspondences on the generative/stylized output.

This process may be utilized in a codec configured to, for example, compress a and transmit new or existing video content. In this case the transmitter would train q(x) on a whole video, a whole series of episodes, a particular director, or an entire catalog. Note that such training need not be on the entirety of the diffusion model but could involve training only select layers using, for example, a low-rank adapter such as LoRA. This model (or just the low-rand adapter) would be transmitted to the receiver. Subsequently, the low-rank/low-bandwidth information would be transmitted, and the conditional diffusion process would reconstruct the original image. In this case the diffusion model would learn the decoder, but the prior (q(x)) keeps it grounded and should reduce the uncanny valley effect.

Exemplary Embodiments for Diffusion-Based Video Communications and Streaming

FIG. 1 illustrates a diffusion-based novel view synthesis (DNVS) communication system 100 in accordance with an embodiment. The system 100 includes a DNVS sending device 110 associated with a first user 112 and a DNVS receiving device 120 associated with a second user 122. During operation of the system 100 a camera 114 within the DNVS sending device 110 captures images 115 of an object or a static or dynamic scene. For example, the camera 114 may record a video including a sequence of image frames 115 of the object or scene. The first user 112 may or may not be appear within the image frames 115.

As shown, the DNVS sending device 110 includes a diffusion model 124 that is conditionally trained during a training phase. In one embodiment the diffusion model 124 is conditionally trained using image frames 115 captured prior to or during the training phase and conditioning data 117 derived from the training image frames by a conditioning data extraction module 116. The conditioning data extraction module 116 may be implemented using a solution such as, for example, MediaPipe Face Mesh, configured to generate 3D face landmarks from the image frames. However, in other embodiments the conditioning data 117 may include other data derived from the training image frames 115 such as, for example, compressed versions of the image frames, or canny edges derived from the image frames 115.

The diffusion model 124 may include an encoder 130, a decoder 131, a noising structure 134, and a denoising network 136. The encoder 130 may be a latent encoder and the decoder 131 may be a latent decoder 131. During training the noising structure 134 adds noise to the training image frames in a controlled manner based upon a predefined noise schedule. The denoising network 134, which may be implemented using a U-Net architecture, is primarily used to perform a "denoising" process during the training process pursuant to which noisy images corresponding to each step of the diffusion process are progressively refined to generate high-quality reconstructions of the training images 115.

Figure 2:
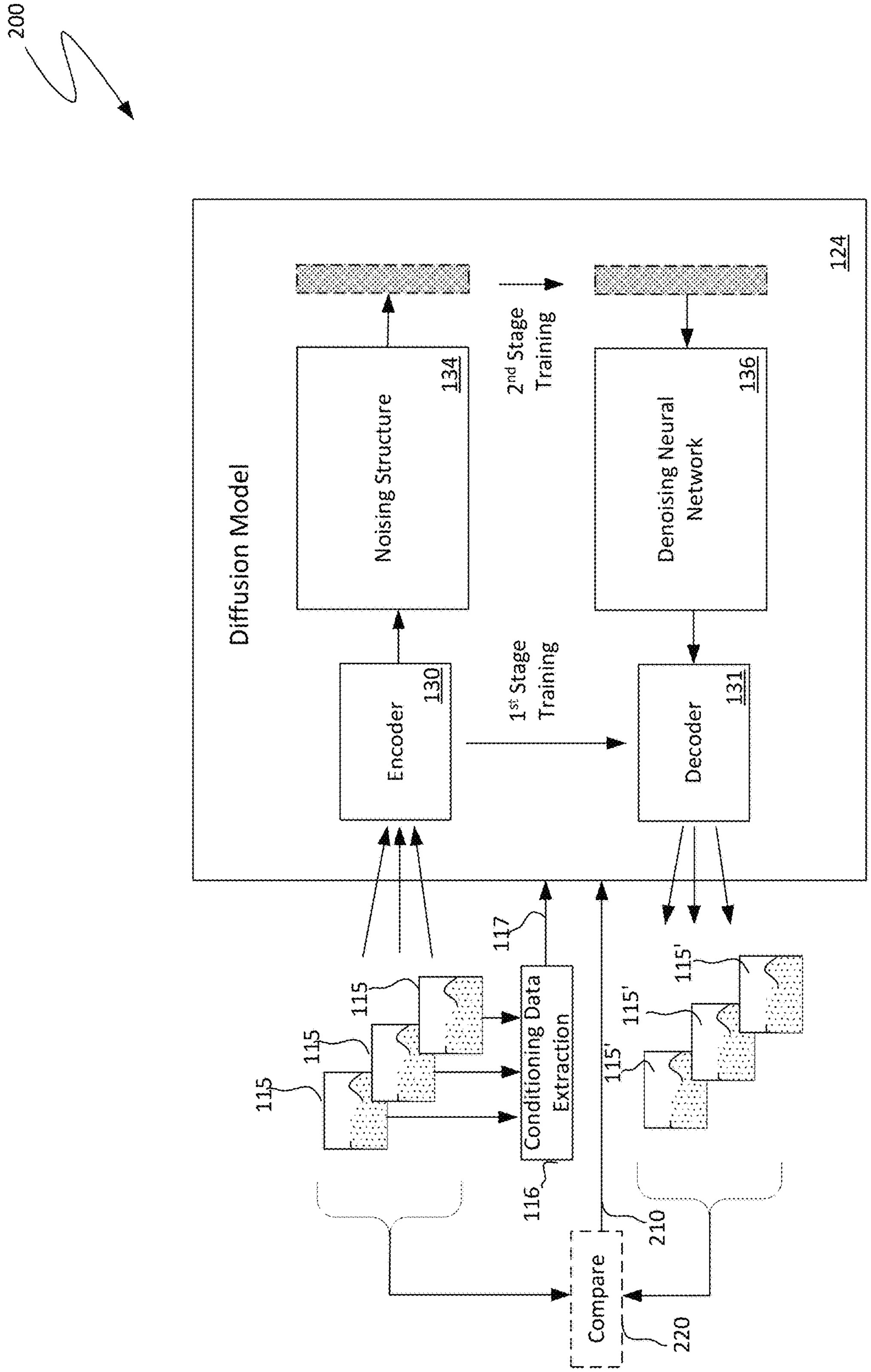
FIG. 2 illustrates a process for conditionally training a diffusion model for use in diffusion-based communication in accordance with the disclosure.

Reference is now made to FIG. 2, which illustrates a process 200 for conditionally training a diffusion model for use in diffusion-based communication in accordance with the disclosure. In one embodiment the encoder 130 and the decoder 131 of the diffusion model, which may be a generative model such as a version of Stable Diffusion, are initially trained using solely the training image frames 115 in order to learn a latent space associated with the training image frames 115. Specifically, the encoder 130 maps image frames 115 to a latent space and the decoder 131 generates reconstructed images 115' from samples in that latent space. The encoder 130 and decoder 131 may be adjusted 210 during training to minimize differences identified by comparing 220 the reconstructed imagery 115' generated by the decoder 131 and the training image frames 115.

After first stage training of the encoder 130 and decoder 131, the combined diffusion model 124 (encoder 130, decoder 131, and diffusion stages 134, 136) may then be trained during a second stage using the image frames 115 acquired for training. During this training phase the model 124 is guided 210 to generate reconstructed images 115' through the diffusion process that resemble the image frames 115. Depending on the specific implementation of the diffusion model 124, the conditioning data 117 derived from the image frames 115 during training can be applied at various stages of the diffusion process to guide the generation of reconstructed images. For example, the conditioning data 117 could be applied only to the noising structure 134, only to the denoising network 136, or to both the noising structure 134 and the denoising network 136.

In some embodiments the diffusion model 124 may have been previously trained using image other than the training image frames 115. In such cases it may be sufficient to perform only the first stage training pursuant to which the encoder 130 and decoder 131 are trained to learn the latent space associated with the training image frames. That is, it may be unnecessary to perform the second stage training involving the entire diffusion model 124 (i.e., the encoder 130, decoder 131, noising structure 134, denoising network 136).

Referring again to FIG. 1, once training of the diffusion model 124 based upon the image frames 115 has been completed, model parameters 138 applicable to the trained diffusion model 124 are sent by the latent DNVS sending device 110 over a network 150 to the DNVS receiving device 120. The model parameters 138 (e.g., encoder/decoder parameters and neural network weights) are applied to a corresponding diffusion model architecture on the DNVS receiving device 120 so as to instantiate a trained diffusion model 156 corresponding to a replica of the trained diffusion model 124. In embodiments in which only the encoder 130 and decoder 131 are trained (i.e., only the first stage training is performed), the model parameters 138 will be limited to parameter settings applicable to the encoder 130 and decoder 131 and can thus be communicated using substantially less data.

Once the diffusion model 124 has been trained and its counterpart trained model 156 established on the DNVS receiving device 120, generated images 158 corresponding to reconstructed versions of new image frames acquired by the camera 114 of the DNVS sending device 120 may be generated by the DNVS receiving device 120 as follows. Upon a new image frame 115 becoming captured by the camera 114, the conditioning data extraction module 116 extracts conditioning data 144 from the new image frame 115 and transmits the conditioning data 144 to the DNVS receiving device. The conditioning data 144 is provided to the trained diffusion model 156, which produces a generated image 158 corresponding to the new image 115 captured by the camera 114. The generated image 158 may then be displayed by a conventional 2D display or a volumetric display. It may be appreciated that because the new image 115 of a subject captured by the camera 114 will generally differ from training images 115 of the subject previously captured by the camera 114, the generated images 158 will generally correspond to "novel views" of the subject in that the trained diffusion model 156 will generally have been trained on the basis of training images 115 of the subject different from such novel views.

The operation of the system 100 may be further appreciated in light of the preceding discussion of the underpinnings of conditional diffusion for video communication and streaming in accordance with the disclosure. In the context of the preceding discussion, the parameter x corresponds to training image frame(s) 115 of a specific face in a lot of different expressions and a lot of different poses. This yields the unconditional diffusion model q(x) that approximates p(x). The parameter y corresponds to the 3D face mesh coordinates produced by the conditioning data extraction module 116 (e.g., MediaPipe, optionally to include body pose coordinates and even eye gaze coordinates), in the most basic form but may also include additional dimensions (e.g., RGB values at those coordinates). During training the conditioning data extraction module 116 produces y from x and thus we can train the conditional diffusion model q(y|x) that estimates p(y|x) using diffusion. Thus, we have everything we need to optimize the estimate of p(x|y) for use following training; that is, to optimize a desired fit or correspondence between conditioning data 144 (y) and a generated image 158 (x).

It may be appreciated that the conditioning data 144 (y) corresponding to an image frame 115 will typically be of substantially smaller size than the image frame 115. Accordingly, the receiving device 120 need not receive new image frames 115 to produce generated images 158 corresponding to such frames but need only receive the conditioning data 120 derived from the new frames 115. Because such conditioning data 144 is so much smaller in size than the captured image frames 115, the DNVS receiving device can reconstruct the image frames 115 as generated images 158 while receiving only a fraction of the data included within each new image frame produced by the camera 114. This is believed to represent an entirely new way of enabling reconstruction of versions of a sequence of image frames (e.g., video) comprised of relatively large amounts of image data from much smaller amounts of conditioning data received over a communication channel.

Figure 3:
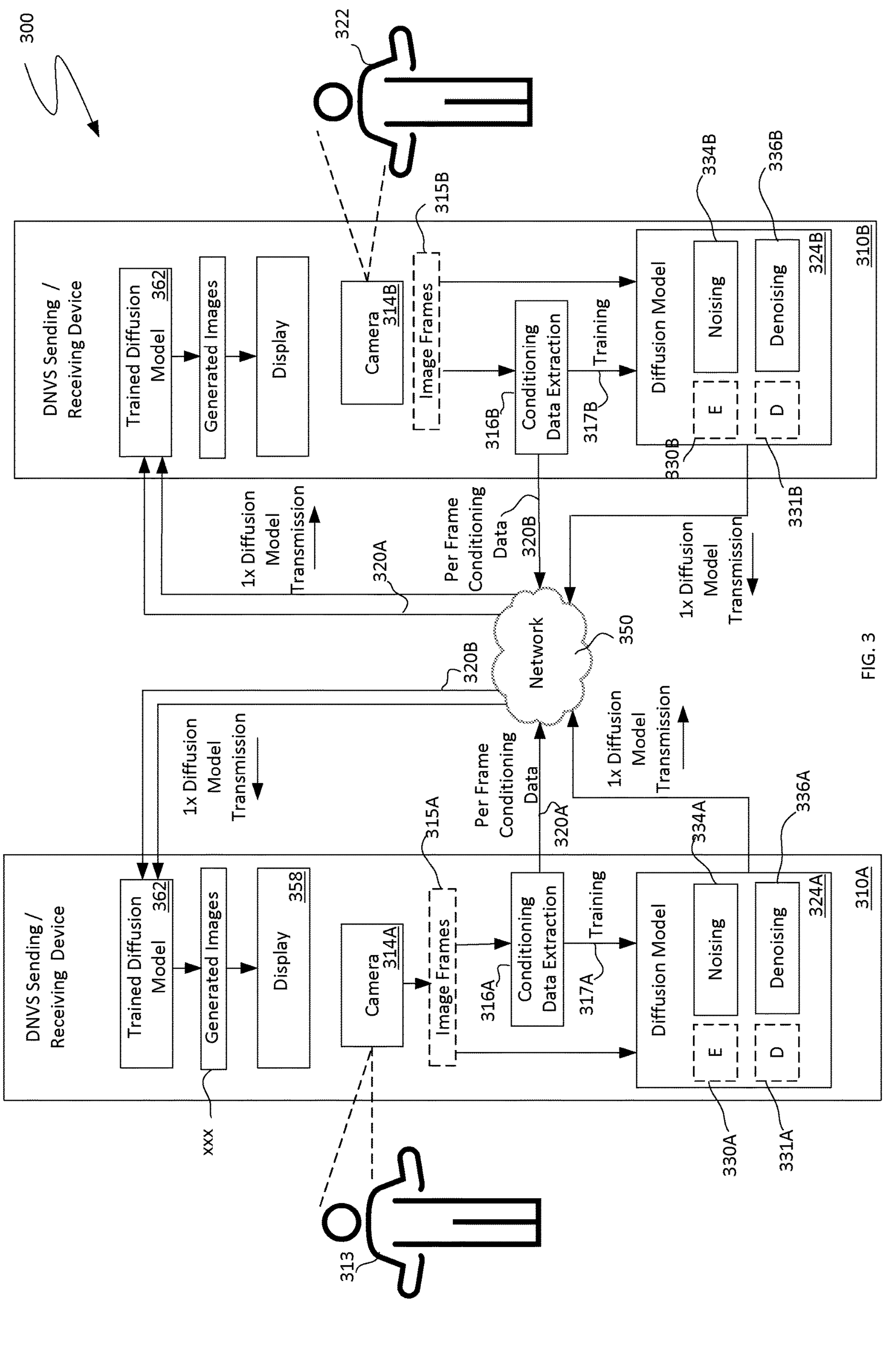
FIG. 3 illustrates another diffusion-based novel view synthesis (DNVS) communication system in accordance with an embodiment.

FIG. 3 illustrates another diffusion-based novel view synthesis (DNVS) communication system 300 in accordance with an embodiment. As may be appreciated by comparing FIGS. 1 and 3, the communication system 300 is substantially similar to the communication system 100 of FIG. 1 with the exception that a first user 312 is associated with a first DNVS sending/receiving device 310A and the second user 322 is associated with a second DNVS sending receiving device 310B. In the embodiment of FIG. 3 both the first DNVS sending/receiving device 310A and the second DNVS sending/receiving device 310B are capable of generating conditionally trained diffusion models 324 representative of an object or scene using training image frames 315 and conditioning data 317 derived from the training image frames 315. Once the diffusion models 324 on each device 310 are trained, weights defining the conditionally trained models 324 are sent (preferably one time) to the other device 310. Each device 310A, 310B may then reconstruct novel views of the object or scene modeled by the trained diffusion model 324 which it has received from the other device 310A, 310B in response to conditioning data 320A, 320B received from such other devices. For example, the first user 312 and the second user 322 could use their respective DNVS sending/receiving devices 310A, 310B to engage in a communication session during which each user 312, 322 could, preferably in real time, engage in video communication with the other user 312, 322. That is, each user 312, 322 could view a reconstruction of a scene captured the camera 314A, 314B of the other user based upon conditioning data 320A, 320B derived from an image frame 315A, 315B representing the captured scene, preferably in real time.

Figure 4:
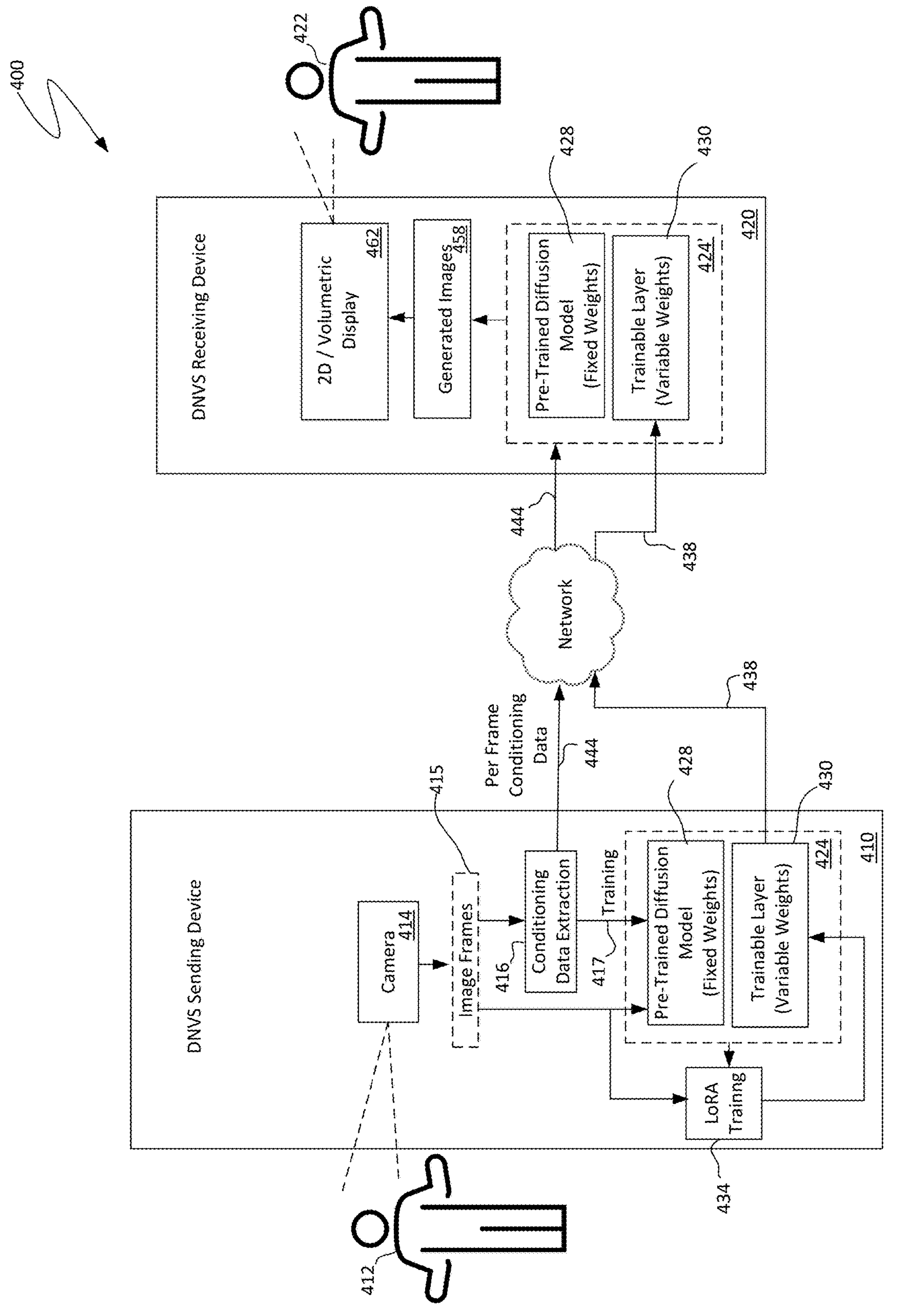
FIG. 4 illustrates an alternative diffusion-based novel view synthesis (DNVS) communication system in accordance with an embodiment.

Attention is now directed to FIG. 4, which illustrates an alternative diffusion-based novel view synthesis (DNVS) communication system 400 in accordance with an embodiment. The system 400 includes a DNVS sending device 410 associated with a first user 412 and a DNVS receiving device 420 associated with a second user 422. During operation of the system 400 a camera 414 within the DNVS sending device 410 captures images 415 of an object or a static or dynamic scene. For example, the camera 414 may record a video including a sequence of image frames 415 of the object or scene. The first user 412 may or may not appear within the image frames 145.

As shown, the DNVS sending device 110 includes a diffusion model 424 consisting of a pre-trained diffusion model 428 and trainable layer 430 of the pre-trained diffusion model 428. In one embodiment the pre-trained diffusion model 428 may be a widely available diffusion model (e.g., Stable Diffusion or the like) that is pre-trained without the benefit of captured image frames 415. During a training phase the diffusion model 424 is conditionally trained through a low-rank adaptation (LoRA) process 434 pursuant to which weights within the trainable layer 430 are adjusted while weights of the pre-trained diffusion model 428 are held fixed. The trainable layer 430 may, for example, comprise a cross-attention layer associated with the pre-trained diffusion model 428; that is, the weights in such cross-attention layer may be adjusted during the training process while the remaining weights throughout the remainder of the pre-trained diffusion model 428 are held constant.

The diffusion model 424 is conditionally trained using image frames 415 captured prior to or during the training phase and conditioning data 417 derived from the training image frames by a conditioning data extraction module 416. Again, the conditioning data extraction module 416 may be implemented using a solution such as, for example, MediaPipe Face Mesh, configured to generate 3D face landmarks from the image frames. However, in other embodiment the conditioning data 417 may include other data derived from the training image frames 415 such as, for example, compressed versions of the image frames, or canny edges derived from the image frames 115.

When training the diffusion model 424 with the training image frames 415 and the conditioning data 417 only model weights 438 within the trainable layer 430 of the diffusion model 424 are adjusted. That is, rather than adjusting weights through the model 424 in the manner described with reference to FIG. 1, training of the model 424 is confined to adjusting weights 438 within the trainable layer 430. This advantageously results in dramatically less data being conveyed from the DNVS sending device 410 to the DNVS receiving device 420 in order to establish a diffusion model 424' on the receiver 420 corresponding to the diffusion model 424. This is because only the weights 438 associated with the trainable layer 430, and not the known weights of the pre-trained diffusion model 428, are communicated to the receiver 420 at the conclusion of the training process.

Once the diffusion model 424 has been trained and its counterpart trained model 424' established on the DNVS receiving device 420, generated images 458 corresponding to reconstructed versions of new image frames acquired by the camera 414 of the DNVS sending device 410 may be generated by the DNVS receiving device 420 as follows. Upon a new image frame 415 becoming captured by the camera 414, the conditioning data extraction module 416 extracts conditioning data 444 from the new image frame 415 and transmits the conditioning data 444 to the DNVS receiving device. The conditioning data 444 is provided to the trained diffusion model 424', which produces a generated image 458 corresponding to the new image 415 captured by the camera 414. The generated image 458 may then be displayed by a conventional 2D display or a volumetric display 462. It may be appreciated that because the new image 415 of a subject captured by the camera 414 will generally differ from training images 415 of the subject previously captured by the camera 414, the generated images 458 will generally correspond to "novel views" of the subject in that the trained diffusion model 424' will generally have been trained on the basis of training images 415 of the subject different from such novel views.

Moreover, although the trained diffusion model 424' may be configured to render generated images 458 which are essentially indistinguishable to a human observer from the image frames 415, the pre-trained diffusion model 428 may also have been previously trained to introduce desired effects or stylization into the generated images 458. For example, the trained diffusion model 424' (by virtue of certain pre-training of the pre-trained diffusion model 428) may be prompted to adjusting the scene lighting (e.g., lighten or darken) within the generated images 458 relative to the image frames 415 corresponding to such images 458. As another example, when the image frames 415 include human faces and the pre-trained diffusion model 428 has been previously trained to be capable of modifying human faces, the diffusion model 424' may be prompted to change the appearance of human faces with within the generated images 458 (e.g., change skin tone, remove wrinkles or blemishes or otherwise enhance cosmetic appearance) relative to their appearance within the image frames 415. Accordingly, while in some embodiments the diffusion model 424' may be configured such that the generated images 458 faithfully reproduce the image content within the image frames 415, in other embodiments the generated images 458 may introduce various desired image effects or enhancements.

Figure 5:
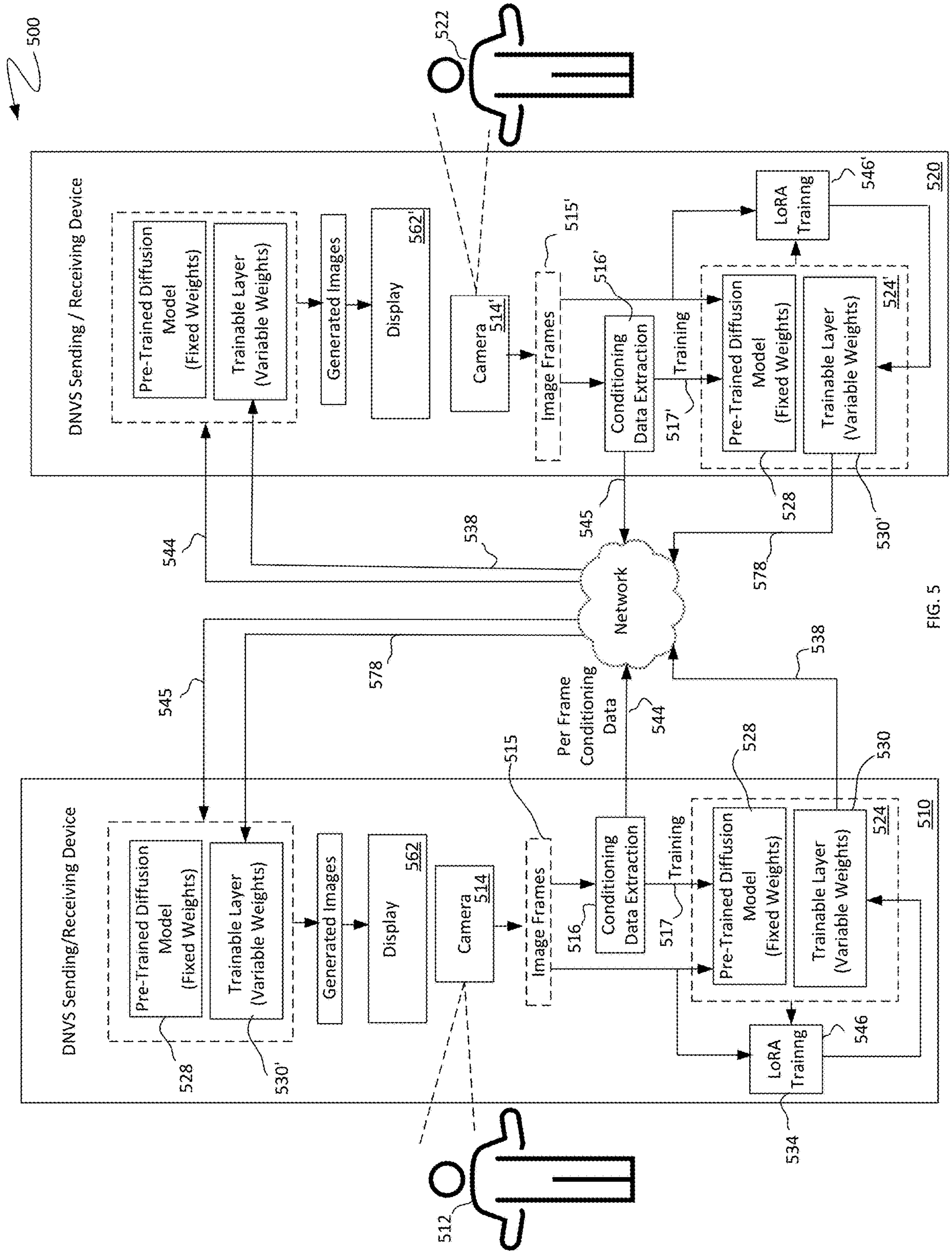
FIG. 5 illustrates another diffusion-based novel view synthesis (DNVS) communication system in accordance with an embodiment.

FIG. 5 illustrates another diffusion-based novel view synthesis (DNVS) communication system 500 in accordance with an embodiment. As may be appreciated by comparing FIGS. 4 and 5, the communication system 500 is substantially similar to the communication system 400 of FIG. 4 with the exception that a first user 512 is associated with a first DNVS sending/receiving device 510 and a second user 522 is associated with a second DNVS sending receiving device 520. In the embodiment of FIG. 5 both the first DNVS sending/receiving device 510 and the second DNVS sending/receiving device 520 are capable of generating conditionally training diffusion models 524, 524' representative of an object or scene using training image frames 515 and conditioning data 517 derived from the training image frames 515. Once the diffusion models 524 on each device 510, 520 are trained, weights 538, 578 for the trainable layers 530, 530' of the conditionally trained models 524, 524' are sent to the other device 510, 520. Updates to the weights 538, 578 may optionally be sent following additional LoRA-based training using additional training image frames 515, 515'. Each device 510, 520 may then reconstruct novel views of the object or scene modeled by the trained diffusion model 524, 524' which it has received from the other device 510, 520 in response to conditioning data 544, 545 received from such other device. For example, the first user 512 and the second user 522 could use their respective DNVS sending/receiving devices 510, 520 to engage in a communication session during which each user 512, 522 could, preferably in real time, engage in video communication with the other user 512, 522. That is, each user 512, 522 could view a reconstruction of a scene captured the camera 514, 514' of the other user based upon conditioning data 544, 545 derived from an image frame 515, 515' representing the captured scene, preferably in real time.

Figure 6:
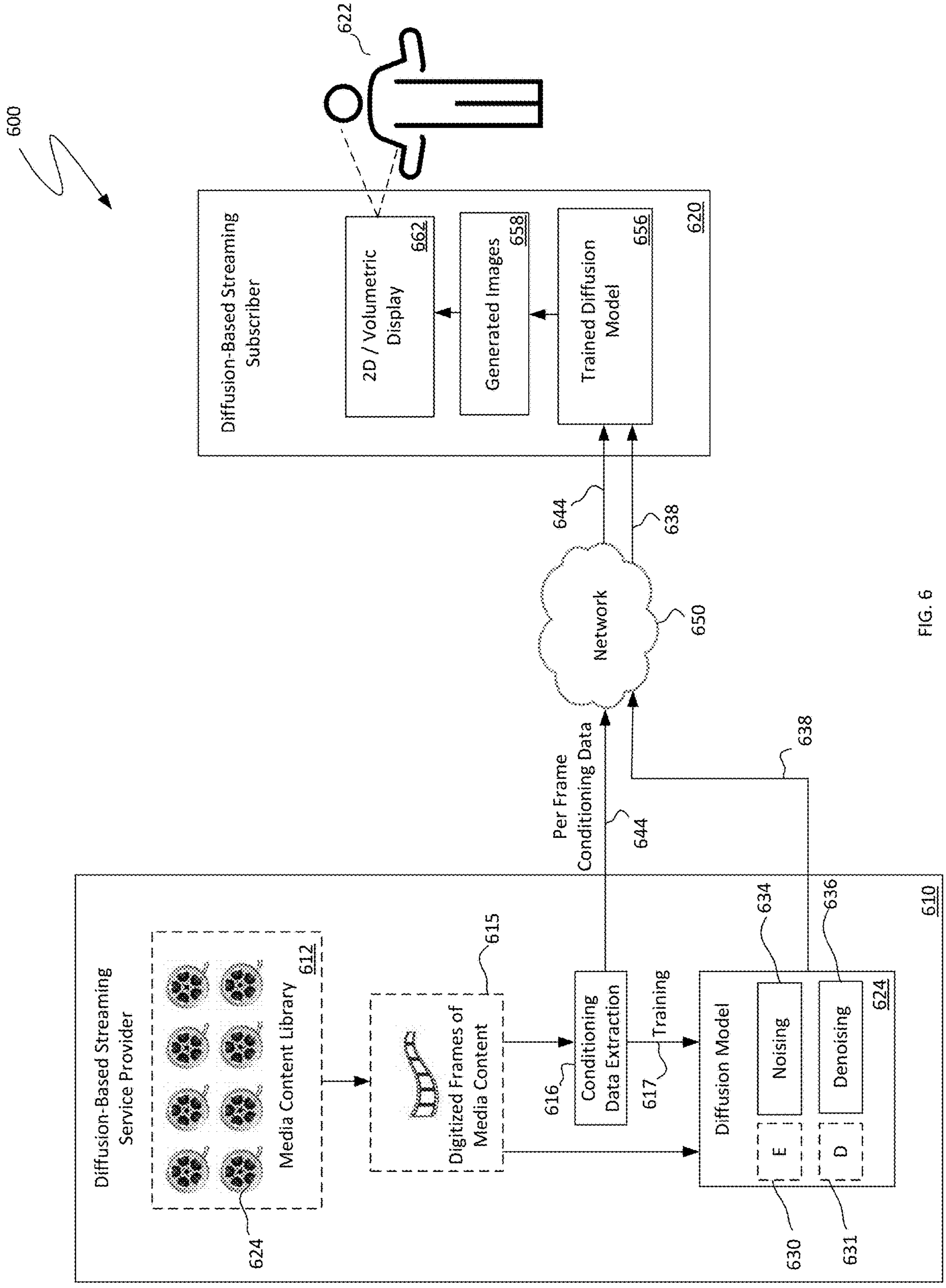
FIG. 6 illustrates a diffusion-based video streaming and compression system in accordance with an embodiment.

FIG. 6 illustrates a diffusion-based video streaming and compression system 600 in accordance with an embodiment. The system 600 includes a diffusion-based streaming service provider facility 610 configured to efficiently convey media content from a media content library 612 to diffusion-based streaming subscriber device 620. As shown, the diffusion-based streaming service provider facility 610 includes a diffusion model 624 that is conditionally trained during a training phase. In one embodiment the diffusion model 624 is conditionally trained using (i) digitized frames of media content 615 from one or more media files 624 (e.g., video files) included within the content library 612 and (ii) conditioning data 617 derived from image frames within the media content by a conditioning data extraction module 616. The conditioning data extraction module 616 may be configured to, for example, generate compressed versions of the image frames within the media content, derive canny edges from the image frames, or otherwise derive representations of such image frames containing substantially less data than the image frames themselves.

The diffusion model 624 may include an encoder 630, a decoder 631, a noising structure 634, and a denoising network 636. The encoder 630 may be a latent encoder and the decoder 631 may be a latent decoder 631. The diffusion model 624 may be trained in substantially the same manner as was described above with reference to training of the diffusion model 124 (FIGS. 1 and 2); provided, however, that in the embodiment of FIG. 6 the training information is comprised of the digitized frames of media content 615 (e.g., all of the video frames in a movie or other video content) and the conditioning data 617 associated with each digitized frame 615.

Referring again to FIG. 6, once training of the diffusion model 624 based upon the digitized frames of media content 615 has been completed, model parameters 638 applicable to the trained diffusion model 624 are sent by the streaming service provider facility 610 over a network 650 to the streaming subscriber device 620. The model parameters 638 (e.g., encoder/decoder parameters) are applied to a corresponding diffusion model architecture on the streaming subscriber device 620 so as to instantiate a trained diffusion model 656 corresponding to a replica of the trained diffusion model 624.

Once the diffusion model 624 has been trained and its counterpart trained model 656 established on the streaming subscriber device 620, generated images 658 corresponding to reconstructed versions of digitized frames of media content may be generated by the streaming subscriber device 620 as follows. For each digitized media content frame 615, the conditioning data extraction module 616 extracts conditioning data 644 from the media content frame 615 and transmits the conditioning data 644 to the streaming subscriber device 620. The conditioning data 644 is provided to the trained diffusion model 656, which produces a generated image 658 corresponding to the media content frame 615. The generated image 658 may then be displayed by a conventional 2D display or a volumetric display. It may be appreciated that because the amount of conditioning data 644 generated for each content frame 615 is substantially less than the amount of image data within each content frame 615, a high degree of compression in obtained by rendering images 658 corresponding to reconstructed versions of the content frames 615 in this manner.

Figure 7:
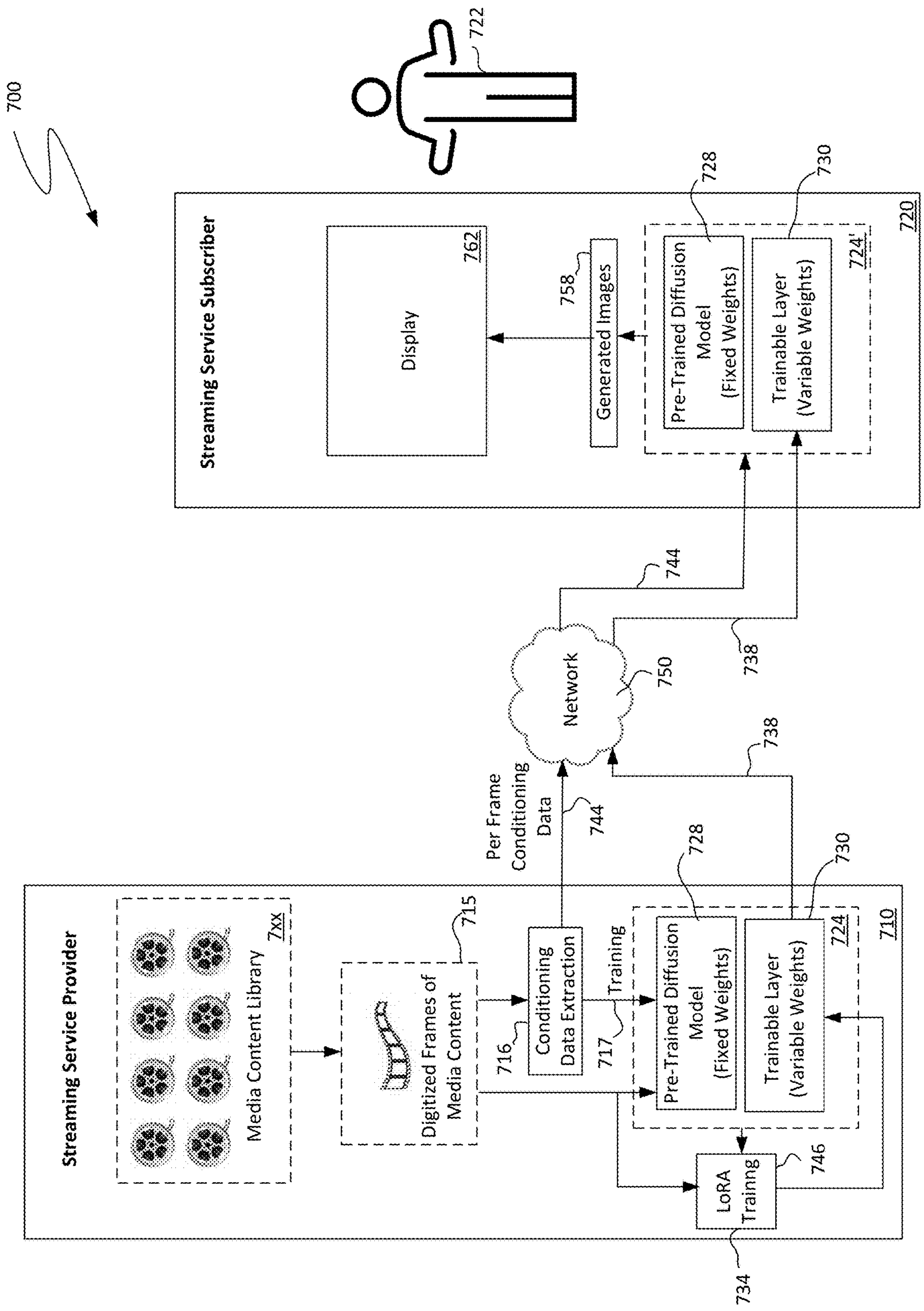
FIG. 7 illustrates a diffusion-based video streaming and compression system in accordance with another embodiment.

FIG. 7 illustrates a diffusion-based video streaming and compression system 700 in accordance with another embodiment. The system 700 includes a diffusion-based streaming service provider facility 710 configured to efficiently convey media content from a media content library 712 to diffusion-based streaming subscriber device 720. As shown, the diffusion-based streaming service provider facility 710 includes a diffusion model 724 that is conditionally trained during a training phase. In one embodiment the diffusion model 724 is conditionally trained using (i) digitized frames of media content 715 from one or more media files 724 (e.g., video files) included within the content library 712 and (ii) conditioning data 717 derived from image frames within the media content by a conditioning data extraction module 716. The conditioning data extraction module 716 may be configured to, for example, generate compressed versions of the image frames within the media content, derive canny edges from the image frames, or otherwise derive representations of such image frames containing substantially less data than the image frames themselves.

As shown, the diffusion model 724 includes a pre-trained diffusion model 728 and trainable layer 730 of the pre-trained diffusion model 728. In one embodiment the pre-trained diffusion model 728 may be a widely available diffusion model (e.g., Stable Diffusion or the like) that is pre-trained without the benefit of the digitized frames of media content 715. During a training phase the diffusion model 724 is conditionally trained through a low-rank adaptation (LoRA) process 734 pursuant to which weights within the trainable layer 730 are adjusted while weights of the pre-trained diffusion model 728 are held fixed. The trainable layer 730 may, for example, comprise a cross-attention layer associated with the pre-trained diffusion model 728; that is, the weights in such cross-attention layer may be adjusted during the training process while the remaining weights throughout the remainder of the pre-trained diffusion model 728 are held constant. The diffusion model 724 may be trained in substantially the same manner as was described above with reference to training of the diffusion model 424 (FIG. 4); provided, however, that in the embodiment of FIG. 7 the training information is comprised of the digitized frames of media content 715 (e.g., all of the video frames in a movie or other video content) and the conditioning data 717 associated with each digitized frame 715.

Because during training of the diffusion model 724 only the model weights 738 within the trainable layer 730 of the diffusion model 724 are adjusted, a relatively small amount of data is required to be conveyed from the streaming facility 710 to the subscriber device 720 in order to establish a diffusion model 724' on the subscriber device 720 corresponding to the diffusion model 724. Specifically, only the weights 738 associated with the trainable layer 730, and not the known weights of the pre-trained diffusion model 728, need be communicated to the receiver 720 at the conclusion of the training process.

Once the diffusion model 724 has been trained and its counterpart trained model 724' have been established on the streaming subscriber device 720, generated images 758 corresponding to reconstructed versions of digitized frames of media content may be generated by the streaming subscriber device 720 as follows. For each digitized media content frame 715, the conditioning data extraction module 716 extracts conditioning data 744 from the media content frame 715 and transmits the conditioning data 744 to the streaming subscriber device 720. The conditioning data 744 is provided to the trained diffusion model 724', which produces a generated image 758 corresponding to the media content frame 715. The generated image 758 may then be displayed by a conventional 2D display or a volumetric display 762. It may be appreciated that because the amount of conditioning data 744 generated for each content frame 715 is substantially less than the amount of image data within each content frame 715, the conditioning data 744 may be viewed as a highly compressed version of the digitized frames of media content 715.

Moreover, although the trained diffusion model 724' may be configured to render generated images 758 which are essentially indistinguishable to a human observer from the media content frames 715, the pre-trained diffusion model 728 may also have been previously trained to introduce desired effects or stylization into the generated images 758. For example, the trained diffusion model 724' may (by virtue of certain pre-training of the pre-trained diffusion model 728) be prompted to adjusting the scene lighting (e.g., lighten or darken) within the generated images 758 relative to the media content frames 715 corresponding to such images. As another example, when the media content frames 715 include human faces and the pre-trained diffusion model 728 has been previously trained to be capable of modifying human faces, the diffusion model 724' may be prompted to change the appearance of human faces with within the generated images 758 (e.g., change skin tone, remove wrinkles or blemishes or otherwise enhance cosmetic appearance) relative to their appearance within the media content frames 715. Accordingly, while in some embodiments the diffusion model 724' may be configured such that the generated images 758 faithfully reproduce the image content within the media content frames 715, in other embodiments the generated images 758 may introduce various desired image effects or enhancements.

Figure 8:
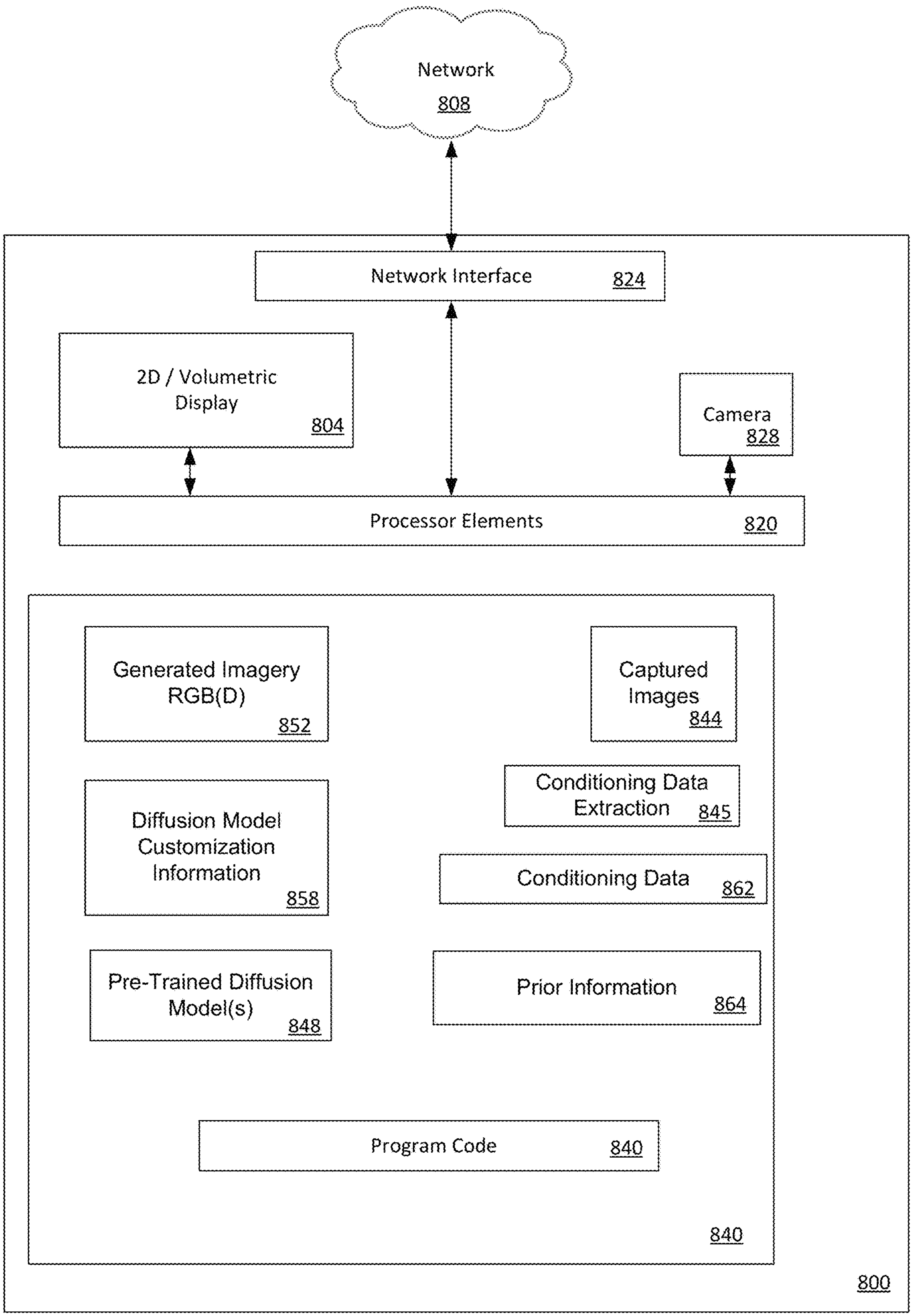
FIG. 8 is a block diagram representation of an electronic device configured to operation as a DNVS sending and/or DNVS receiving device in accordance with the disclosure.

Attention is now directed to FIG. 8, which includes a block diagram representation of an electronic device 800 configured to operation as a DNVS sending and/or DNVS receiving device in accordance with the disclosure. It will be apparent that certain details and features of the device 800 have been omitted for clarity. The device 800 may be in communication with another DNVS sending and receiving device (not shown) via a communications link which may include, for example, the Internet, the wireless network 808 and/or other wired or wireless networks. The device 800 includes one or more processor elements 820 which may include, for example, one or more central processing units (CPUs), graphics processing units (GPUs), neural processing units (NPUs), neural network accelerators (NNAs), application specific integrated circuits (ASICs), and/or digital signal processors (DSPs). As shown, the processor elements 820 are operatively coupled to a touch-sensitive 2D/volumetric display 804 configured to present a user interface 208. The touch-sensitive display 804 may comprise a conventional two-dimensional (2D) touch-sensitive electronic display (e.g., a touch-sensitive LCD display). Alternatively, the touch-sensitive display 804 may be implemented using a touch-sensitive volumetric display configured to render information holographically. See, e.g., U.S. Patent Pub. No. 20220404536 and U.S. Patent Pub. No. 20220078271. The device 800 may also include a network interface 824, one or more cameras 828, and a memory 840 comprised of one or more of, for example, random access memory (RAM), read-only memory (ROM), flash memory and/or any other media enabling the processor elements 820 to store and retrieve data. The memory 840 stores program code 840 and/or instructions executable by the processor elements 820 for implementing the computer-implemented methods described herein.

The memory 840 is also configured to store captured images 844 of a scene which may comprise, for example, video data or a sequence of image frames captured by the one or more cameras 828. A conditioning data extraction module 845 configured to extract or otherwise derive conditioning data 862 from the captured images 844 is also stored. The memory 840 may also contain information defining one or more pre-trained diffusion models 848, as well as diffusion model customization information for customizing the pre-trained diffusion models based upon model training of the type described herein. The memory 840 may also store generated imagery 852 created during operation of the device as a DNVS receiving device. As shown, the memory 840 may also store various prior information 864.

Use of Low-Rank Adaptation (LoRA) Training in Video Communication and Streaming In another aspect the disclosure proposes an approach for drastically reducing the overhead associated with diffusion-based compression techniques. The proposed approach involves using low-rank adaptation (LoRA) weights to customize diffusion models. Use of LoRA training results in several orders of magnitude less data being required to be pre-transmitted to a receiver at the initiation of a video communication or streaming session using diffusion-based compression. Using LoRA techniques a given diffusion model may be customized by modifying only a particular layer of the model while generally leaving the original weights of the model untouched. As but one example, the present inventors have been able to customize a Stable Diffusion XL model (10 GB) with a LoRA update (45 MB) to make a custom diffusion model of an animal (i.e., a pet dog) using a set of 9 images of the animal.

In a practical application a receiving device (e.g., a smartphone, tablet, laptop or other electronic device) configured for video communication or rendering streamed content would already have a standard diffusion model previously downloaded (e.g., some version of Stable Diffusion or the equivalent). At the transmitter, the same standard diffusion model would be trained using LoRA techniques on a set of images (e.g., on photos or video of a video communication participant or on the frames of pre-existing media content such as, for example, a movie or a show having multiple episodes). Once the conditionally-trained diffusion model has been sent to the receiver by sending a file of the LoRA customizing weights, it would subsequently only be necessary to transmit LoRA differences used to perform conditional diffusion decoding. This approach avoids the cost of sending a custom diffusion model from the transmitter to the receiver to represent each video frame (as well as the cost of training such a diffusion model from scratch in connection with each video frame).

In some embodiments the above LoRA-based conditional diffusion approach could be enhanced through the use of dedicated hardware. For example, one or both of the transmitter and receiver devices could store the larger diffusion model (e.g., which could be on the order of (10 GB)) on an updateable System on a Chip (SoC), thus permitting only the conditioning data metadata and LoRA updates in a much smaller file (e.g., 45 MB or less).

Some video streams may include scene/set changes that can benefit from further specialization of adaptation weights (e.g., LoRA). Various types of scene/set changes could benefit from such further specialization:

A scene that evolves gradually: e.g., subjects in motion.

scene that changes abruptly: e.g., a scene or set change.

A video stream may also alternate between sets.

Figure 9A:
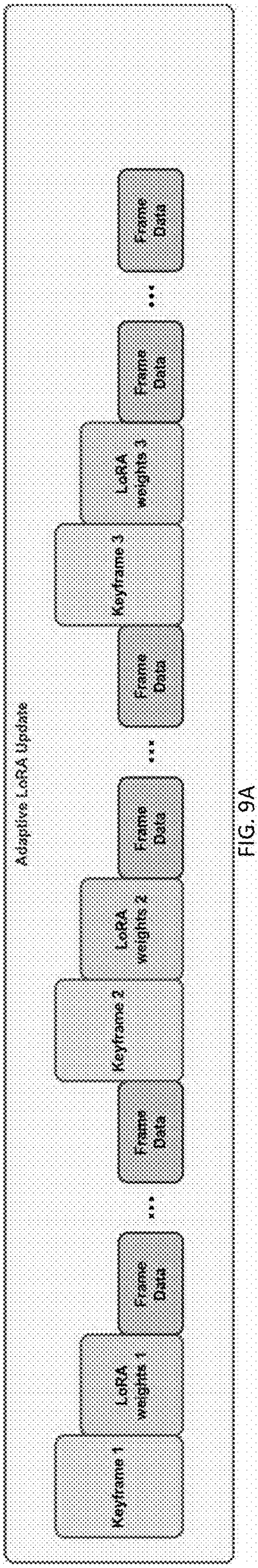
FIG. 9A illustrates LoRA adaptation weight updates throughout a transmitted video stream.
Figure 9B:
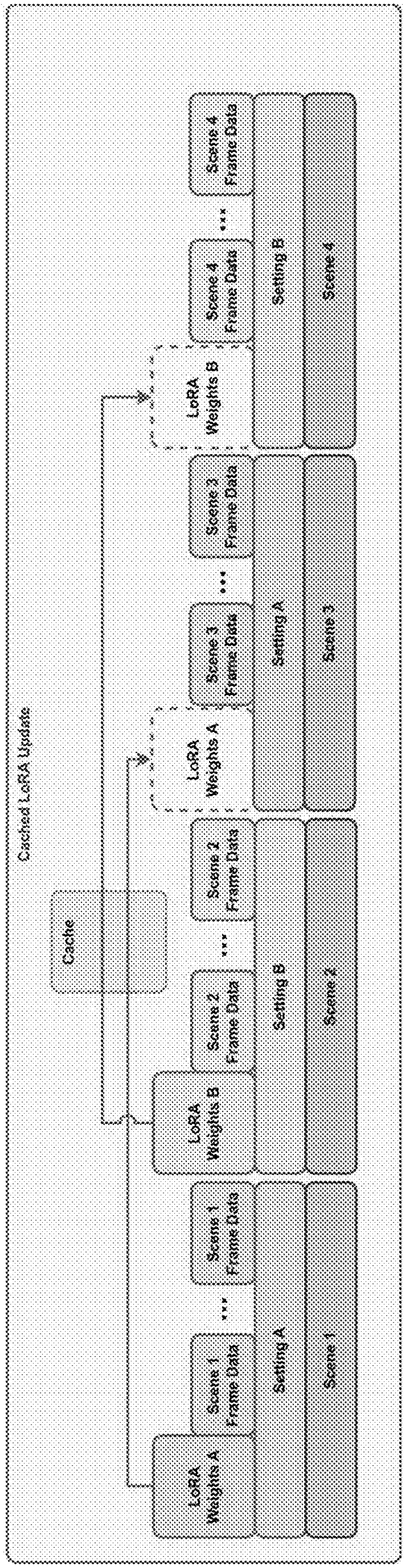
FIG. 9B illustrates LoRA adaptation weight updates cached and applied to different parts of a transmitted video stream.

FIGS. 9A and 9B illustrate approaches for further specialization of adaptation weights. The exemplary methods of FIGS. 9A and 9B involve update LoRA weights throughout the video stream (or file) being transmitted. In the approach of FIG. 9A, periodic weight updates are sent (for example with each new keyframe). In the approach of FIG. 9B, different weights may be cached and applied to different parts of the video, for example if there are multiple clusters of video subjects/settings.

Referring to FIG. 9A in more detail, as the LoRA weights are very small relative to image data, new weights could be sent frequently (e.g., with each keyframe), allowing the expressive nature of the diffusion model to evolve over time. This allows a video to be encoded closer to real time as it avoids the latency required to adapt to the entire video file. This has the additional benefit that if a set of weights is lost (e.g., due to network congestion), the quality degradation should be small until the next set of weights is received. An additional benefit is that the new LoRA weights may be initialized with the previous weights, thus reducing computational burden of the dynamic weight update at the transmitter. In a holographic chat scenario, the sender may periodically grab frames (especially frames not seen before) and update the LoRA model that is then periodically transmitted to the recipient, thus over time the representative quality of the weights continues to improve.

Turning now to FIG. 9B, as a video stream may alternate between multiple sets and subjects, we may also dynamically send new LoRA weights as needed. This could be determined adaptively when a frame shows dramatic changes from previous scenes (e.g., in the latent diffusion noise realization), or when the reconstruction error metric (e.g., PSNR) indicates loss of encoding quality.

As is also indicated in FIG. 9B, we may also cache these weights and reference previous weights. For example, one set of weights may apply to one set of a movie, whereas a second set of weights to a second set. As the scenes change back and forth, we may refer to those previously-transmitted LoRA weights.

Additional Prompt Guidance for Conditional Diffusion

A standard presentation of conditional diffusion includes the use of an unconditional model, combined with additional conditional guidance. For example, in one approach the guidance may be a dimensionality reduced set of measurements and the unconditional model is trained on a large population of medical images. See, e.g., Song, et al. "Solving Inverse Problems in Medical Imaging with Score-Based Generative Models"; arXiv preprint arXiv: 2111.08005 [eess.IV] (Jun. 16, 2022). With LoRA, we have the option of adding additional guidance to the unconditional model. Some examples follow.

We may replace the unconditional model with a LoRA-adapted model using the classifier-free-guidance method (e.g., StableDiffusion). In this case, we would not provide a fully unconditional response, but we would instead at a minimum provide the general prompt (or equivalent text embedding). For example, when specializing with dreambooth, the customization prompt may be "a photo of a <placeholder> person", where "<placeholder>" is a word not previously seen. When running inference we provide that same generic prompt as additional guidance. This additional guidance may optionally apply to multiple frames, whereas the other information (e.g., canny edges, face mesh landmarks) are applied per-frame.

We may also infer (or solve for) the text embedding (machine-interpretable code produced from the human-readable prompt) that best represents the image.

We may also provide a noise realization from either:

- the noise state from a run of the forward process,
- inference (solve for) the best noise realization that produced the given text (e.g., via backpropagation),
- inference (solve for) the random number generator (RNG) seed that produced the noise state.

Finally, if we transmit noise we may structure that noise to further compress the information, some options include:

- imposing sparsity on the noise realization (e.g., mostly zeros) and compress that information before transmitting (e.g., only send the values and location of the non-zero values),
- use a predictable noise sequence (e.g., a PN sequence) that best initializes the data, as a maximal-length PN sequence may be compactly represented by only the state of the generator (e.g., a linear-feedback shift register).

Figure 10:
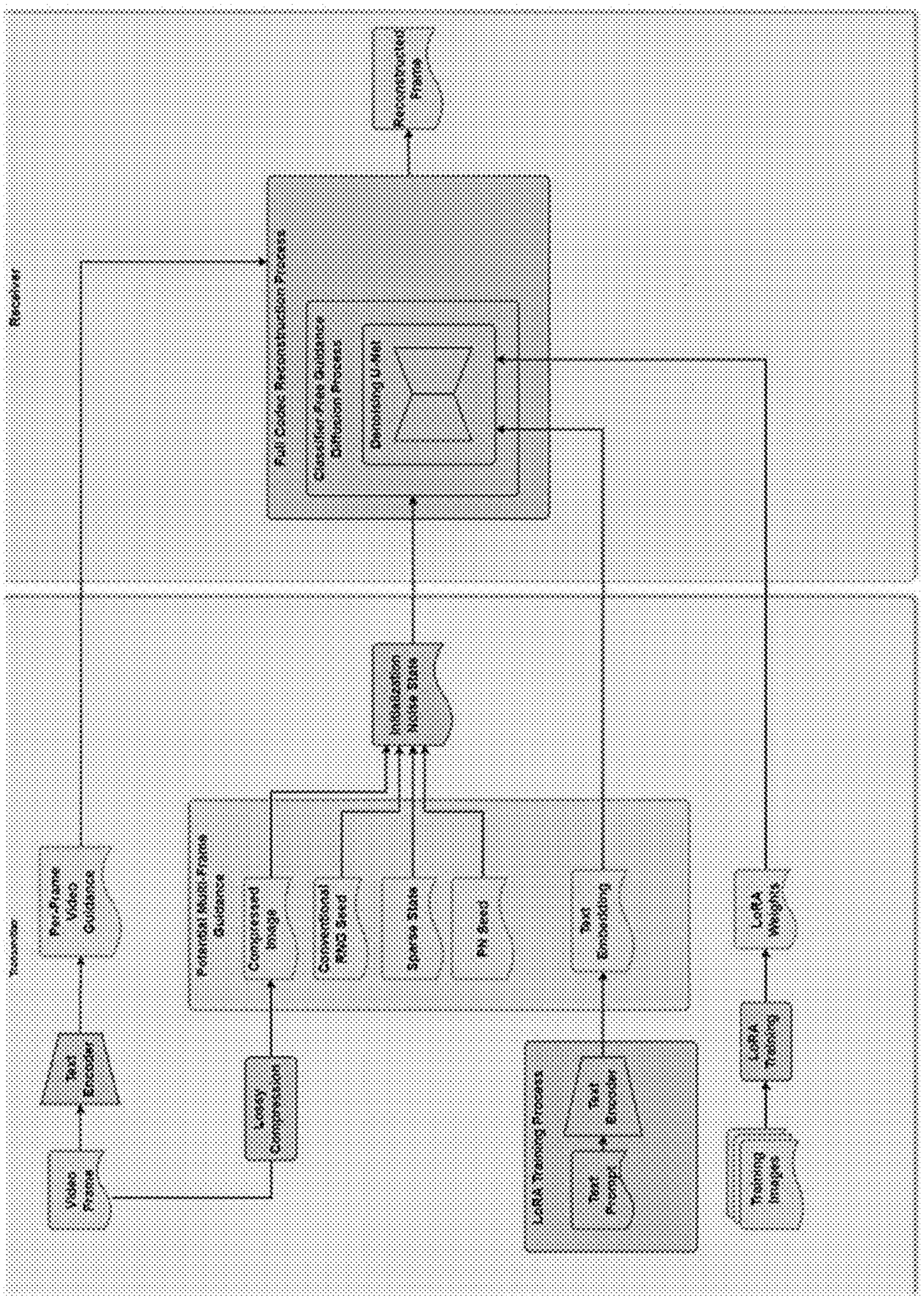
FIG. 10 illustrates an exemplary adapted diffusion codec process to reconstruct an image.

FIG. 10 illustrates an exemplary adapted diffusion codec process. A video frame is sent to a text encoder, which sends per-frame video guidance to a full code reconstruction process at a receiver. The video frame and subsequent frames are subject to lossy compression and multi-frame guidance that includes a conventional RNG seed, Sparse State, a PN seed and text embedding. Some guidance information (e.g., lossy initialization images, LoRA adaptation weights) may be shared across frames for diffusion-based video, but some information (e.g., canny edges, face landmarks) are used once per frame and thereby constitute per-frame video guidance. A single image may serve as guidance for multiple frames; that image may be low-resolution as we desire to keep the transmission small, and it is only used as an initialization; we may also compute or infer noise states that perform a similar function as it is used by the classifier-free-guidance diffusion process. Training images are applied to a LoRA training process to produce LoRA Weights. The LoRA updates the Denoising UNet. Variations on the image caption used for LoRA training process has text prompts processed by a text encoder, which forms text embeddings before consumption by the diffusion process. The diffusion process forms a reconstructed frame.

More recent (and higher resolution) diffusion models (e.g., StableDiffusion XL) may use both a denoiser network and a refiner network. In accordance with the disclosure, the refiner network is adapted with LoRA weights and those weights are potentially used to apply different stylization, while the adapted denoiser weights apply personalization. Various innovations associated with this process include:

- Applying adaptation networks (e.g., LoRA) to any post-denoising refiner networks.
- Applying adaptation to either or both.
- Optionally, apply stylization to the refiner network while the denoiser network handles primary customization
  - e.g., having a style for business (realistic representation, professional attire, well-groomed) and personal (more fun attire, hair color, or more fantastical appearance).

Real-Time Diffusion

When applying the diffusion methods herein to real-time video, one problem that arises is real time rendering given that a single frame would currently require at least several seconds if each frame is generated at the receive from noise. Modern denoising diffusion models typically slowly add noise to a target image with a well-defined distribution (e.g., Gaussian) to transform it from a structured image to noise in the forward process, allowing a ML model to learn the information needed to reconstruct the image from noise in the reverse process. When applied to video this would require beginning each frame from a noise realization and proceeding with several (sometimes 1000+) diffusion steps. This is computationally expensive and that complexity grows with frame rate.

One approach in accordance with the disclosure recognizes that the previous frame may be seen as a noisy version of the subsequent frame and thus we would rather learn a diffusion process from the previous frame to the next frame. This approach also recognizes that as the frame rate increases, the change between frames decreases, and thus the diffusion steps required in between frames would reduce, and thus counterbalances the computational burden introduced by additional frames.

The most simplistic version of this method is to initialize the diffusion process of the next frame with the previous frame. The denoiser (which may be specialized for the data being provided) simply removes the error between frames. Note that the previous frame may itself be derived from its predecessor frame, or it may be initialized from noise (a diffusion analog to a keyframe).

A better approach is to teach the denoiser to directly move between frames, not simply from noise. The challenge is that instead of moving from a structured image to an unstructured image using noise that is well modeled (statistically) each step, we must diffuse from one form of structure to the next. In standard diffusion the reverse process is only possible because the forward process is well defined. This approach uses two standard diffusion models to train a ML frame-to-frame diffusion process. The key idea is to run the previous frame (which has already been decoded/rendered) in the forward process but with a progressively decreasing noise power and the subsequent frame in the reverse process with a progressively increasing noise power. Using those original diffusion models, we are able to provide small steps between frames, which can be learned with a ML model (such as the typical UNet architecture). Furthermore, if we train this secondary process with score-based diffusion (employing differential equations), we may also interpolate in continuous time between frames.

Once trained, the number of diffusion steps between frames may vary. The number of diffusion steps could vary based on the raw framerate, or it could dynamically change based on changes in the image. In both the total number of iterations should typically approach some upper bound, meaning the computation will be bounded and predictable when designing hardware. That is, with this approach it may be expected that as the input framerate increases, the difference between frames would decrease, thus requiring fewer diffusion iterations. Although the number of diffusion calls would grow with framerate, the number of diffusion iterations may reduce with framerate, leading to some type of constant computation or lower bound behavior. This may provide "bullet time" output for essentially no additional computational cost.

Additionally, the structured frame may itself be a latent representation. This includes the variational autoencoders used for latent diffusion approaches, or it may be the internal representation of a standard codec (e.g., H.264).

As this method no longer requires the full forward denoising diffusion process, we may also use this method to convert from a low-fidelity frame to a high-fidelity reconstruction (see complementary diffusion compression discussion below). A frame that is intentionally low-fidelity (e.g., low-pass filtered) will have corruption noise that is non-gaussian (e.g., spatially correlated), and thus this method is better tuned to the particular noise introduced.

Although not necessary to implement the disclosed technique for real-time video diffusion, we have recognized that the previous frame may be viewed as a noisy version of the subsequent frame. As a consequence, the denoising U-Nets may be used to train an additional UNet which does not use Gaussian noise as a starting point. Similar opportunities exist for volumetric video. Specifically, even in the absence of scene motion, small changes occur in connection with tracked head motion of the viewer. In this sense the previous viewing angle may be seen as a noisy version of subsequent viewing angles, and thus a similar structure-to-structure UNet may be trained.

In order to improve the speed of this process, we may use sensor information to pre-distort the prior frame, e.g., via a low-cost affine Homomorphic transformation, which should provide an even closer (i.e., lower-noise) version of the subsequent frame. We may also account for scene motion by using feature tracking and combining with a more complex warping function (e.g., a thin-plate spline warping).

Finally, this technique need not be applied exclusively to holographic video. In the absence of viewer motion (i.e., holographic user head position changes), the scene may still be pre-distorted based on the same feature tracking described above.

Various innovations associated with this process include:

- In holographic video, previous viewing angles may be seen as noisy versions of subsequent viewing angles and thus we may apply the same structure-to-structure UNet training as we did with time, but now as a function of angle.
  - We may combine this with dynamic scenes such that we train a UNet to adapt to both space and time.
- Whether we are tracking scene motion or head motion, we may further pre-distort the previous frame image based on additional data to provide a diffusion starting point that is closer to the subsequent frame (i.e., lower initial noise).
  - We may use feature tracking to compute scene changes.
  - We may use accelerometer information or pose estimated from features/fiducial markers to estimate head motion.
  - We may then apply affine transformations or more complex warping such as thin plate splines to pre-distort.
  - This may work with scene motion only, viewer motion only, or both motions, thus it may be applied to both 2D and 3D video diffusion.

In the previous section, the use of splines was mentioned as a way of adjusting the previous frame to be a better initializer of the subsequent frame. The goal of that processing was higher fidelity and faster inference time. However, the warping of input imagery may also serve an additional purpose. This is particularly useful when an outer autoencoder is used (as is done with Stable Diffusion), as that can struggle to faithfully reproduce hands and faces when they do not occupy enough of the frame. Using a warping function, we may devote more pixels to important areas (e.g., hands and face) at the expense of less-important features. Note we are not proposing masking cropping and merging, but a more natural method that does not require an additional run.

Furthermore, there are additional benefits beyond just faithful human feature reconstruction. We may simply devote more latent pixels to areas of the screen in focus at the expense of those not in focus. This would not require human classification. Note that "in-focus" areas may be determined by a Jacobian calculation (as is done with ILC cameras). While this may improve the fidelity of the parts the photographer/videographer "cares" about, this may also allow a smaller size image to be denoised with the same quality, thus improving storage size and training/inference time. It is likely that use of LoRA customization on a distorted frame (distorted prior to VAE encoder) will produce better results.

Various innovations associated with this process include:

- Naturally distort an image based on important features detected (e.g., hands, face) to improve perceptual inference quality
  - use a complex spline (e.g., thin-pate-spline) to avoid needing to mask, join or run diffusion multiple times.
- Naturally distort an image based on in-focus (or areas with high sharpness or detail) at the expense of low-frequency areas (e.g., smooth walls, or areas out of focus).
  - we may determine this via a Jacobian or other measure of sharpness on the latent pixels.
  - this will naturally improve image quality to faces and hands (presuming they are in focus by the photographer).
  - this will naturally improve overall image quality.
  - this may also allow us to use smaller image resolution (improving computation time).
- We may combine this with LoRA customization
  - apply the distortion outside of the VAE autoencoder then use LoRA to work with distorted images.

Audio-Guided Diffusion

In one embodiment methods such as ControlNet are extended to include facial expressions as guided by phonetic sound and/or sentiment. Both of those could be detected from audio analysis algorithms, and optionally translated to a different language by another algorithm. In video chat applications, by sending the time-aligned phonetics/sentiment it is possible to further refine the facial expression of the transmitted subject with extremely low-bandwidth additional data. When used with, for example, LoRA customization, training could involve either (1) prompting the subject to say words containing all different phonetics, and/or (2) utilizing natural video (e.g., past video chats) as training information linking audio content and facial expression.

Figure 11:
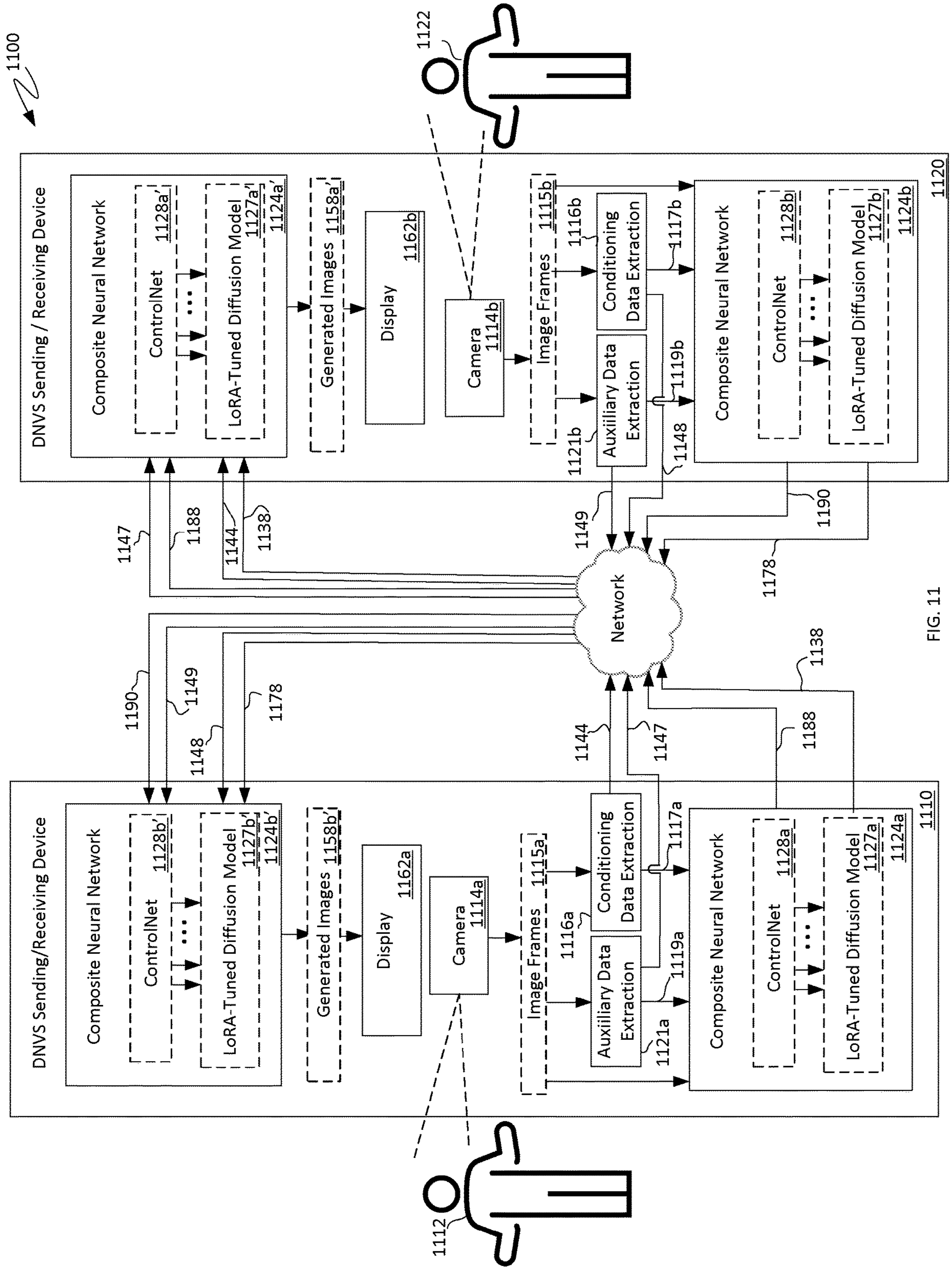
FIG. 11 illustrates a diffusion-based novel view synthesis (DNVS) communication system utilizing audio-guided diffusion in accordance with an embodiment.

Attention is now directed to FIG. 11, which illustrates a diffusion-based novel view synthesis (DNVS) communication system 1100 utilizing audio-guided diffusion in accordance with an embodiment. As shown, a first user 1112 is associated with a first DNVS sending/receiving device 1110 and a second user 1122 is associated with a second DNVS sending receiving device 1120. In the embodiment of FIG. 11 both the first DNVS sending/receiving device 1110 and the second DNVS sending/receiving device 1120 are capable of training composite neural networks 1124*a*, 1124*b* representative of an object or scene. The composite neural networks 1124*a*, 1124*b* each include a first neural network implementing a LoRA-tuned diffusion model 1127*a*, 1127*b* in combination with a second neural network implementing a ControlNet 1128*a*, 1128*b*. A ControlNet is a is a neural network that allows for fine-tuning pre-trained diffusion models, such as the LoRA-tuned diffusion models 1127*a*, 1127*b*, to achieve more control over the image generation process. See, Zhang, L., Rao, A., & Agrawala, M. (2023 Feb. 10). "Adding conditional control to text-to-image diffusion models". arXiv: 2302.05543.

The composite neural networks 1124*a*, 1124*b* may be trained using training data including (i) image frames 1115*a*, 1115*b*, (ii) conditioning data 1117*a*, 1117*b* derived from the image frames 1115*a*, 1115*b* by conditioning data extraction modules 116*a*, 116*b*, and (iii) auxiliary data 1119*a*, 1119*b* derived by auxiliary data extraction modules 1121*a*, 1121*b* from audio content associated with the image frames 1115*a*, 1115*b*. In one embodiment training of the composite neural networks 1124*a*, 1124*b* is accomplished in two training phases. During a first training phase LoRA-based techniques are used to initially train the diffusion models 1127*a*, 1127*b* within the composite neural networks 1124*a*, 1124*b* using image frames 1115*a*, 1115*b* and conditioning data 1117*a*, 1117*b* derived from the image frames 1115*a*, 1115*b*. In a second training phase the ControlNet 1128*a*, 1128*b* within each composite neural network 1124*a*, 1124*b* is trained using other image frames 1115*a*, 1115*b* and auxiliary data 1119*a*, 1119*b* derived from the other image frames 1115*a*, 1115*b*.

During the first training phase the diffusion models 1127*a*, 1127*b* are conditionally trained through a low-rank adaptation (LoRA) process pursuant to which weights within trainable layers of the diffusion models 1127*a*, 1127*b* are adjusted while the remaining weights of the diffusion models 1127*a*, 1127*b*, which typically have been pre-trained, are held fixed. The trainable layers of the diffusion models 1127*a*, 1127*b* may, for example, comprise a cross-attention layer; that is, the weights in such cross-attention layer may be adjusted during the training process while the remaining weights throughout the remainder of the diffusion models 1127*a*, 1127*b* are held constant. The diffusion models 1127*a*, 1127*b* may be conditionally trained using the training data including the image frames 1115*a*, 1115*b* and the conditioning data 1117*a*, 1117*b* derived from the training image frames 1115*a*, 1115*b* in substantially the same manner as was described above with reference to training of the diffusion model 424 (FIG. 4). Once the diffusion models 1127*a* on the first DNVS device 1110 has been trained, weights 1138 for the trainable layers of the conditionally trained model 1127*a* are sent to the second DNVS device 1120. At the second DNVS 1120 the weights 1138 are used to tune or otherwise configure the weights of a trainable layer of a diffusion model 1127*a*' such that the tuned diffusion model 1127*a*' essentially replicates the conditionally trained diffusion model 1127*a*. Similarly, at the first DNVS 1110, weights 1178 received from the second DNVS 1120 are used to tune or otherwise configure the weights of a trainable layer of a diffusion model 1127*b*' such that the tuned diffusion model 1127*b*' essentially replicates the conditionally trained diffusion model 1127*b*. Updates to the weights 1138, 1178 may optionally be sent following additional LoRA-based training using additional training image frames 1115*a*, 1115*b*.

Once the diffusion models 1127*a*, 1127*b* have been conditionally trained as discussed above, the composite neural networks 1124*a*, 1124*b* as configured with the diffusion models 1127*a*, 1127*b* may be further trained during the second training phase. The additional training data using in the second training phase includes additional image frames 1115*a*, 1115*b* and auxiliary data 1119*a*, 1119*b* derived from the image frames 1115*a*, 1115*b*. Again, the auxiliary data 1119*a*, 1119*b* is derived by auxiliary data extraction modules 1121*a*, 1121*b* from audio content associated with image frames 1115*a*, 1115*b* included within the additional training data. In one embodiment the audio content corresponds to speech from a human subject present within such image frames 1115*a*, 1115*b* and the auxiliary data is in the form of phonetic data generated by algorithms executed by the auxiliary data extraction modules 1121*a*, 1121*b*. Alternatively or in addition, the auxiliary data may be in the form of sentiment data generated by algorithms executed by the auxiliary data extraction modules 1121*a*, 1121*b* based upon the speech of the subject.

During training of the composite neural networks 1124*a*, 1124*b* during the second training phase, training data including image frames 1115*a*, 1115*b* involving the subject and auxiliary data 1119*a*, 1119*b* derived from audio data associated with the image frames 1115*a*, 1115*b* are provided to the composite neural networks 1124*a*, 1124*b*. The ControlNet 1128*a*, 1128*b* or other control neural network within each composite neural network 1124*a*, 1124*b* preferably includes a trainable copy of one or more layers of the artificial neural network implementing the LoRA-tuned diffusion model 1127*a*, 1127*b* within such composite neural network 1124*a*, 1124*b*. During this second training phase, values of the weights of the ControlNet 1128*a*, 1128*b* are adjusted while values of the weights of the LoRA-tuned diffusion model 1127*a*, 1127*b* remain constant.

The image frames 1115*a*, 1115*b* of training data utilized during the second training phase may, for example, be included within a training video of the subject speaking a specified set of words. The set of words may be selected so as to collectively include substantially all phonetics associated with a language being spoken by the subject. During the second training phase the subject may be prompted to speak the words while the training video is being recorded. Alternatively, the image frames 1115*a*, 1115*b* used during the second training phase may be included within one or more videos of the subject speaking which are recorded prior to initiation of the second training phase.

Figure 12:
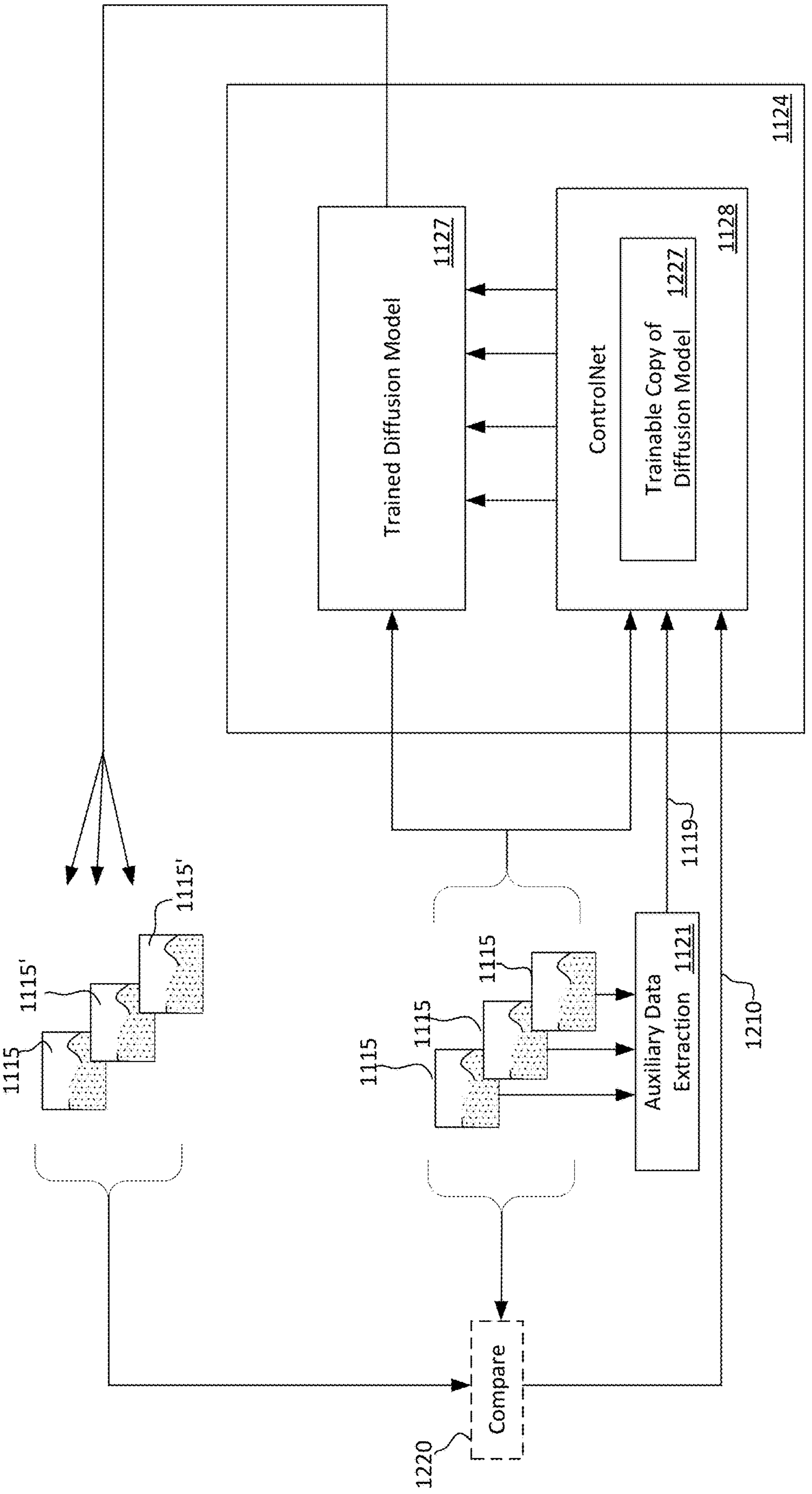
FIG. 12 illustrates additional details of the second training phase pursuant to which the ControlNet within each composite neural network is trained.

FIG. 12 illustrates additional details of the second training phase pursuant to which the ControlNet 1128 within each composite neural network 1124 is trained. Again, during the first training phase the diffusion model 1127 is trained using image frames 1115 and conditioning data 1117 derived from the image frames 1115 in the manner discussed above. Upon completion of the first training phase, the ControlNet 1128 is configured to include a trainable copy 1227 of the diffusion model 1127 trained during the first training phase. During the second training phase, additional image frames 1115 are provided to the trained diffusion model 1127 and to the ControlNet 1128. Auxiliary data 1119 extracted from audio information associated with the additional image frames is also provided to the ControlNet 1128. Weights of the ControlNet 1128 are then adjusted 1210 based upon a comparison 1220 of reconstructed images 1115' generated through the diffusion process effected by the composite neural network 1124 to the image frames 1115 used for training. The use of the audio-related auxiliary data 1119 during the second training phase may advantageously allow the facial expressions of the subject speaking within the reconstructed images 1115' to be sufficiently refined so as to closely match those of the subject when speaking within the image frames 1115 used for training.

Referring again to FIG. 11, once training of the ControlNet 1128 within each composite neural network 1124 is has been completed, weights 1188 for the ControlNet 1128*a* are sent by the first DNVS device 1110 to the second DNVS device 1120. At the second DNVS 1120 the weights 1188 are used to configure the weights of a counterpart ControlNet 1128*a*' such that the composite neural network 1124' essentially replicates the composite neural network 1124 within the first DNVS 1110. Similarly, at the first DNVS 1110, weights 1190 received from the second DNVS 1120 are used to configure the weights of a counterpart ControlNet 1128*b*' such that the composite neural network 1124*b*' essentially replicates the composite neural network 1124*b*.

Once the counterpart composite neural networks 1124*a*', 1124*b*' have been established on the first and second DNVS devices 1110, 1120, operation in an inference phase may be initiated. During inference, generated images 1158 corresponding to reconstructed versions of new image frames acquired by the camera 1114 of one of the DNVS devices 1110, 1120 may be generated by the other of the DNVS devices 1110, 1120. For example, consider the case in which the second DNVS device 1120 operates to reconstruct new image frames 1115*a* acquired by the camera 1114*a* of the first DNVS device 1110. In this case, upon a new image frame 1115*a* becoming captured by the camera 1114*a*, the conditioning data extraction module 1116*a* extracts conditioning data 1144 from the new image frame 1115*a* and transmits the conditioning data 1144 to the second DNVS device 1120. In addition, the auxiliary data extraction module 1121*a* extracts auxiliary data 1147 from the new image frame 1115*a* and transmits the auxiliary data 1147 to the second DNVS device 1120. At the second DNVS device 1120, the conditioning data 1144 is provided to the LoRA-tuned diffusion model 1127*a*' and the auxiliary data 1147 is provided to the ControlNet 1128*a*'. The composite neural network 1124*a*' then produces generated images 1158*a*' corresponding to the new image frames 1115*a* captured by the camera 1114*a*. The generated images 1158*a*' may then be displayed by a conventional 2D display or a volumetric display 1162*b*.

Similarly, the first DNVS device 1110 may operate to reconstruct new image frames 1115*b* acquired by the camera 1114*b* of the second DNVS device 1120. In this case, upon a new image frame 1115*b* becoming captured by the camera 1114*b*, the conditioning data extraction module 1116*b* extracts conditioning data 1148 from the new image frame 1115*b* and transmits the conditioning data 1148 to the first DNVS device 1110. In addition, the auxiliary data extraction module 1121*b* extracts auxiliary data 1149 from the new image frame 1115*b* and transmits the auxiliary data 1149 to the first DNVS device 1110. At the first DNVS device 1110, the conditioning data 1148 is provided to the LoRA-tuned diffusion model 1127*b*' and the auxiliary data 1149 is provided to the ControlNet 1128*b*'. The composite neural network 1124*b*' then produces generated images 1158*b*' corresponding to the new image frames 1115*b* captured by the camera 1114*b*. The generated images 1158*b*' may then be displayed by a conventional 2D display or a volumetric display 1162*a*.

Where methods described above indicate certain events occurring in certain order, the ordering of certain events may be modified. Additionally, certain of the events may be performed concurrently in a parallel process when possible, as well as performed sequentially as described above. Accordingly, the specification is intended to embrace all such modifications and variations of the disclosed embodiments that fall within the spirit and scope of the appended claims.

The foregoing description, for purposes of explanation, used specific nomenclature to provide a thorough understanding of the claimed systems and methods. However, it will be apparent to one skilled in the art that specific details are not required in order to practice the systems and methods described herein. Thus, the foregoing descriptions of specific embodiments of the described systems and methods are presented for purposes of illustration and description. They are not intended to be exhaustive or to limit the claims to the precise forms disclosed; obviously, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated. It is intended that the following claims and their equivalents define the scope of the systems and methods described herein.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computer-implemented method for generating image sequences, the method comprising: receiving, at a computing device, values of fine-tuning weights for a first artificial neural network implementing a pre-trained diffusion model and values of weights of a first control neural network wherein the weights of the first artificial network are generated by training the first artificial neural network using a first set of frames of a first set of training image data involving a subject and conditioning training data derived from the first set of frames of the first set of training image data and wherein the weights of the first control neural network are generated by training a first composite neural network including the first artificial neural network and the first control neural network, the training the first composite neural network including providing, to the first composite neural network, a second set of frames of a second set of training image data involving the subject and auxiliary training data derived from audio data associated with the second set of frames of the second set of training image data; wherein the first artificial neural network includes one or more layers with fixed weights implementing the pre-trained diffusion model and at least one trainable layer including the fine-tuning weights where the values of the fine-tuning weights are adjusted during the training of the first artificial neural network; configuring a second artificial neural network by inserting the values of the fine-tuning weights into an adaptable layer of the second artificial neural network wherein the second artificial neural network includes fixed-weight layers implementing the pre-trained diffusion model; modifying a second control neural network based upon the values of the weights of the first control neural network, the second control neural network and the second artificial neural network forming a second composite neural network; receiving, at the computing device, conditioning data derived from input frames of image data containing the subject and auxiliary data generated from audio data associated with the input frames of image data; generating, by the second composite neural network, images corresponding to the input frames of image data using the conditioning data and the auxiliary data.

2. The method of claim 1 wherein the first control neural network includes a trainable copy of one or more layers of the first artificial neural network, the values of the weights of the first control neural network are adjusted during the training of the first composite neural network, and the values of the weights of the first artificial neural network are not adjusted during the training of the first composite neural network.

3. The method of claim 1 wherein the auxiliary data includes one of phonetic data and sentiment data associated with the subject.

4. The method of claim 1 wherein the values of the fine-tuning weights correspond to low-rank adaptation (LoRA) parameter values.

5. The method of claim 1 wherein the auxiliary data is time aligned with the conditioning data.

6. The method of claim 1 wherein the audio data associated with the input frames of image data and the audio data associated with the second set of frames of the second set of training image data includes speech of the subject in a first language and wherein the auxiliary data is generated in part by translating the speech of the subject to a second language.

7. The method of claim 1 wherein the conditioning data corresponds to one of compressed representations of the input frames of image data and sparse representations of the input frames of image data.

8. The method of claim 1 wherein the first set of frames of the first set of training image data include a face of the subject.

9. The method of claim 8 wherein the conditioning training data includes a first set of three-dimensional coordinate locations corresponding to facial landmarks of the face.

10. The method of claim 1 wherein the generating includes:

sampling from a normal distribution to generate a set of sampled values;

performing denoising operations in accordance with the diffusion model.

11. A computer-implemented method, comprising: generating a set of fine-tuning weights for a pre-trained diffusion model, the generating including training a first artificial neural network using a first set of frames of a first set of training image data involving a subject and conditioning training data derived from the first set of frames of the first set of training image data, the first artificial neural network having one or more layers with fixed weights implementing the pre-trained diffusion model and at least one trainable layer including the fine-tuning weights where values of the fine-tuning weights are adjusted during the training; training a first composite neural network including the first artificial neural network and a first control neural network, the training including providing, to the first composite neural network, a second set of frames of a second set of training image data involving the subject and auxiliary training data derived from audio data associated with the second set of frames of the second set of training image data; sending, to a computing device, the values of the fine-tuning weights and values of weights of the first control neural network wherein the computing device is disposed to (i) insert the values of the fine-tuning weights into an adaptable layer of a second artificial neural network having fixed-weight layers implementing the pre-trained diffusion mode and (ii) modify a second control neural network based upon the values of the weights of the first control neural network, the second control neural network and the second artificial neural network forming a second composite neural network; deriving conditioning data from input frames of image data containing the subject; generating auxiliary data from audio data associated with the input frames of image data; and sending the conditioning data and the auxiliary data to the computing device wherein the second composite neural network is configured to generate images corresponding to the input frames of image data using the conditioning data and the auxiliary data.

12. The method of claim 11 wherein the first control neural network includes a trainable copy of one or more layers of the first artificial neural network, the method further including adjusting values of the weights of the first control neural network during the training of the first composite neural network wherein the values of the weights of the first artificial neural network are not adjusted during the training of the first composite neural network.

13. The method of claim 11 wherein the auxiliary data includes one of phonetic data and sentiment data associated with the subject.

14. The method of claim 11 further including time aligning the auxiliary data with the conditioning data.

15. The method of claim 11 wherein the audio data associated with the input frames of image data and the audio data associated with the second set of frames of the second set of training image data includes speech of the subject in a first language, the method further including generating the auxiliary data in part by translating the speech of the subject to a second language.

16. The method of claim 11 wherein the values of the fine-tuning weights correspond to low-rank adaptation (LoRA) parameter values.

17. The method of claim 11 wherein the conditioning data corresponds to one of compressed representations of the input frames of image data and sparse representations of the input frames of image data.

18. The method of claim 11 wherein the first set of frames of the first set of training image data include a face of the subject.

19. The method of claim 18 wherein the conditioning training data includes a first set of three-dimensional coordinate locations corresponding to facial landmarks of the face.

20. The method of claim 19 wherein the conditioning data includes a second set of three-dimensional coordinate locations corresponding to the facial landmarks of the face wherein the second set of coordinate locations are different from the first set of three-dimensional coordinate locations.

* * * * *